US010029789B2

(12) United States Patent
Liu et al.

(10) Patent No.: US 10,029,789 B2
(45) Date of Patent: Jul. 24, 2018

(54) CONTEXT-BASED FLIGHT MODE SELECTION

(71) Applicant: SZ DJI TECHNOLOGY CO., LTD, Shenzhen (CN)

(72) Inventors: Ang Liu, Shenzhen (CN); Xiao Hu, Shenzhen (CN); Guyue Zhou, Shenzhen (CN); Xuyang Pan, Shenzhen (CN)

(73) Assignee: SZ DJI TECHNOLOGY CO., LTD, Shenzhen (CN)

( * ) Notice: Subject to any disclaimer, the term of this patent is extended or adjusted under 35 U.S.C. 154(b) by 0 days.

(21) Appl. No.: 15/340,404

(22) Filed: Nov. 1, 2016

(65) Prior Publication Data

US 2017/0045886 A1    Feb. 16, 2017

Related U.S. Application Data

(63) Continuation of application No. 15/088,645, filed on Apr. 1, 2016, now Pat. No. 9,604,723, which is a
(Continued)

(51) Int. Cl.
*B64C 13/18* (2006.01)
*B64C 39/02* (2006.01)
(Continued)

(52) U.S. Cl.
CPC ............ *B64C 39/024* (2013.01); *B64C 19/00* (2013.01); *G05D 1/0061* (2013.01);
(Continued)

(58) Field of Classification Search
None
See application file for complete search history.

(56) References Cited

U.S. PATENT DOCUMENTS 5,173,947 A    12/1992  Chande et al.
5,631,640 A     5/1997  Deis et al.
(Continued)

FOREIGN PATENT DOCUMENTS

CA        2830009 A1    6/2014
CN      101403620 A     4/2009
(Continued)

OTHER PUBLICATIONS

Notice of allowance dated Feb. 28, 2017 for U.S. Appl. No. 14/801,599.
(Continued)

*Primary Examiner* — Richard G Davis
(74) *Attorney, Agent, or Firm* — Anova Law Group, PLLC

(57) ABSTRACT

Systems and methods for controlling an unmanned aerial vehicle within an environment are provided. In one aspect, a system comprises one or more sensors carried by the unmanned aerial vehicle and configured to provide sensor data and one or more processors. The one or more processors can be individually or collectively configured to: determine, based on the sensor data, an environment type for the environment; select a flight mode from a plurality of different flight modes based on the environment type, wherein each of the plurality of different flight mode is associated with a different set of operating rules for the unmanned aerial vehicle; and cause the unmanned aerial vehicle to operate within the environment while conforming to the set of operating rules of the selected flight mode.

22 Claims, 14 Drawing Sheets

Related U.S. Application Data continuation of application No. 14/801,640, filed on Jul. 16, 2015, now Pat. No. 9,592,911, which is a continuation of application No. PCT/CN2014/086006, filed on Sep. 5, 2014.

(51) Int. Cl.

| | | |
|---|---|---|
| *G05D 1/00* | (2006.01) | |
| *G05D 1/02* | (2006.01) | |
| *G05D 1/04* | (2006.01) | |
| *G05D 1/10* | (2006.01) | |
| *B64C 19/00* | (2006.01) | |
| *G08G 5/04* | (2006.01) | |

(52) U.S. Cl.
CPC .......... *G05D 1/0088* (2013.01); *G05D 1/0202* (2013.01); *G05D 1/042* (2013.01); *G05D 1/101* (2013.01); *G08G 5/045* (2013.01); *B64C 2201/141* (2013.01); *B64C 2201/145* (2013.01); *B64C 2201/146* (2013.01)

(56) References Cited

U.S. PATENT DOCUMENTS

| | | | |
|---|---|---|---|
| 5,682,229 A | 10/1997 | Wangler | |
| 5,716,032 A | 2/1998 | McIngvale | |
| 5,785,281 A | 7/1998 | Peter et al. | |
| 6,056,237 A | 5/2000 | Woodland | |
| 6,122,572 A | 9/2000 | Yavnai | |
| 6,377,875 B1 | 4/2002 | Schwaerzler | |
| 6,377,889 B1 | 4/2002 | Soest | |
| 6,597,987 B1 | 7/2003 | Barton | |
| 6,661,918 B1 | 12/2003 | Gordon et al. | |
| 6,804,607 B1 | 10/2004 | Wood | |
| 6,985,810 B2 | 1/2006 | Moitra et al. | |
| 7,107,148 B1 | 9/2006 | Bodin et al. | |
| 7,130,741 B2 | 10/2006 | Bodin et al. | |
| 7,158,877 B2 | 1/2007 | Carlsson et al. | |
| 7,195,200 B2 | 3/2007 | Yamane | |
| 7,228,232 B2 | 6/2007 | Bodin et al. | |
| 7,231,294 B2 | 6/2007 | Bodin et al. | |
| 7,242,791 B2 | 7/2007 | Han et al. | |
| 7,266,477 B2 | 9/2007 | Foessel et al. | |
| 7,302,316 B2 | 11/2007 | Beard et al. | |
| 7,431,243 B1 | 10/2008 | Allen | |
| 7,494,320 B2 | 2/2009 | Muren | |
| 7,512,462 B2 | 3/2009 | Nichols et al. | |
| 7,571,051 B1 | 8/2009 | Shulman | |
| 7,606,115 B1 | 10/2009 | Cline et al. | |
| 7,737,878 B2 | 6/2010 | Van Tooren et al. | |
| 7,747,067 B2 | 6/2010 | Popescu et al. | |
| 7,792,330 B1 | 9/2010 | Lowder et al. | |
| 7,979,174 B2 | 7/2011 | Fregene et al. | |
| 8,072,581 B1 | 12/2011 | Breiholz | |
| 8,082,102 B2 | 12/2011 | Ravenscroft | |
| 8,108,092 B2 | 1/2012 | Phillips et al. | |
| 8,108,139 B1 | 1/2012 | Pylant | |
| 8,116,928 B2 | 2/2012 | Wu et al. | |
| 8,275,544 B1 | 9/2012 | Wells et al. | |
| 8,355,834 B2 * | 1/2013 | Duggan | G05D 1/0061 244/75.1 |
| 8,374,786 B2 | 2/2013 | Buros | |
| 8,378,881 B2 | 2/2013 | Lemire et al. | |
| 8,380,425 B2 | 2/2013 | Duggan et al. | |
| 8,401,225 B2 | 3/2013 | Newcombe et al. | |
| 8,521,339 B2 | 8/2013 | Gariepy et al. | |
| 8,538,673 B2 | 9/2013 | Sislak et al. | |
| 8,543,265 B2 | 9/2013 | Ekhaguere et al. | |
| 8,566,071 B2 | 10/2013 | Shumaker et al. | |
| 8,666,661 B2 | 3/2014 | Higgins | |
| 8,676,498 B2 | 3/2014 | Ma et al. | |
| 8,711,206 B2 | 4/2014 | Newcombe et al. | |
| 8,712,679 B1 | 4/2014 | Mostofi et al. | |
| 8,798,922 B2 | 8/2014 | Tillotson et al. | |
| 8,825,226 B1 | 9/2014 | Worley, III et al. | |
| 8,868,328 B1 | 10/2014 | Estkowski | |
| 8,909,391 B1 | 12/2014 | Peeters et al. | |
| 8,996,207 B2 | 3/2015 | Goossen et al. | |
| 9,031,782 B1 | 5/2015 | Lemay et al. | |
| 9,051,043 B1 * | 6/2015 | Peeters | B64C 19/00 |
| 9,056,676 B1 | 6/2015 | Wang | |
| 9,085,354 B1 | 7/2015 | Peeters et al. | |
| 9,164,506 B1 | 10/2015 | Zang | |
| 9,367,067 B2 | 6/2016 | Gilmore et al. | |
| 9,592,911 B2 | 3/2017 | Liu et al. | |
| 9,592,912 B1 | 3/2017 | Michini et al. | |
| 9,604,723 B2 | 3/2017 | Liu et al. | |
| 9,625,907 B2 | 4/2017 | Hu et al. | |
| 9,625,909 B2 | 4/2017 | Hu et al. | |
| 2003/0055540 A1 | 3/2003 | Hansen | |
| 2003/0152892 A1 | 8/2003 | Huang et al. | |
| 2003/0191561 A1 | 10/2003 | Vos | |
| 2004/0028258 A1 | 2/2004 | Naimark et al. | |
| 2004/0167667 A1 | 8/2004 | Goncalves et al. | |
| 2004/0193334 A1 | 9/2004 | Carlsson et al. | |
| 2005/0004723 A1 | 1/2005 | Duggan et al. | |
| 2005/0128196 A1 | 6/2005 | Popescu et al. | |
| 2005/0182518 A1 | 8/2005 | Karlsson et al. | |
| 2005/0238200 A1 | 10/2005 | Gupta et al. | |
| 2006/0015247 A1 | 1/2006 | Speer | |
| 2006/0049930 A1 | 3/2006 | Zruya et al. | |
| 2006/0106506 A1 | 5/2006 | Nichols et al. | |
| 2006/0147088 A1 | 7/2006 | Han et al. | |
| 2006/0149472 A1 | 7/2006 | Han et al. | |
| 2006/0197937 A1 | 9/2006 | Bamji et al. | |
| 2006/0222207 A1 | 10/2006 | Balzer et al. | |
| 2006/0235610 A1 | 10/2006 | Ariyur et al. | |
| 2007/0018052 A1 | 1/2007 | Eriksson | |
| 2007/0093945 A1 | 4/2007 | Grzywna et al. | |
| 2007/0106473 A1 | 5/2007 | Bodin et al. | |
| 2007/0156286 A1 | 7/2007 | Yamauchi | |
| 2007/0193798 A1 | 8/2007 | Allard et al. | |
| 2007/0252748 A1 | 11/2007 | Rees et al. | |
| 2007/0280528 A1 | 12/2007 | Wellington et al. | |
| 2008/0009965 A1 | 1/2008 | Bruemmer et al. | |
| 2008/0027591 A1 | 1/2008 | Lenser et al. | |
| 2008/0033645 A1 | 2/2008 | Levinson et al. | |
| 2008/0059065 A1 | 3/2008 | Strelow et al. | |
| 2008/0154490 A1 | 6/2008 | Hoofd et al. | |
| 2008/0195304 A1 | 8/2008 | Krishnaswamy | |
| 2008/0195316 A1 | 8/2008 | Krishnaswamy | |
| 2008/0215204 A1 | 9/2008 | Roy et al. | |
| 2009/0027253 A1 | 1/2009 | Van Tooren et al. | |
| 2009/0157233 A1 | 6/2009 | Kokkeby et al. | |
| 2009/0167761 A1 | 7/2009 | Hayashi et al. | |
| 2009/0177398 A1 | 7/2009 | Belenkii et al. | |
| 2009/0210109 A1 | 8/2009 | Ravenscroft | |
| 2009/0213240 A1 | 8/2009 | Sim et al. | |
| 2009/0234499 A1 | 9/2009 | Nielsen et al. | |
| 2009/0248304 A1 | 10/2009 | Roumeliotis et al. | |
| 2010/0001902 A1 | 1/2010 | Smith | |
| 2010/0004798 A1 | 1/2010 | Bodin et al. | |
| 2010/0017115 A1 | 1/2010 | Gautama | |
| 2010/0030470 A1 | 2/2010 | Wang et al. | |
| 2010/0040279 A1 | 2/2010 | Yoon et al. | |
| 2010/0063651 A1 | 3/2010 | Anderson | |
| 2010/0084513 A1 | 4/2010 | Gariepy et al. | |
| 2010/0100269 A1 | 4/2010 | Ekhaguere et al. | |
| 2010/0109945 A1 | 5/2010 | Roh | |
| 2010/0198514 A1 | 8/2010 | Miralles | |
| 2010/0250022 A1 | 9/2010 | Hines et al. | |
| 2010/0250133 A1 | 9/2010 | Buros | |
| 2010/0265126 A1 | 10/2010 | Mao | |
| 2010/0280699 A1 | 11/2010 | Bageshwar et al. | |
| 2010/0303340 A1 | 12/2010 | Abraham et al. | |
| 2010/0304070 A1 | 12/2010 | Meles | |
| 2010/0305778 A1 | 12/2010 | Dorneich et al. | |
| 2010/0312917 A1 | 12/2010 | Allport | |
| 2011/0054689 A1 | 3/2011 | Nielsen et al. | |
| 2011/0084162 A1 | 4/2011 | Goossen et al. | |
| 2011/0106339 A1 | 5/2011 | Phillips et al. | |
| 2011/0123135 A1 | 5/2011 | Hsieh et al. | |
| 2011/0178658 A1 | 7/2011 | Kotaba et al. | |

(56) References Cited

U.S. PATENT DOCUMENTS

| | | |
|---|---|---|
| 2011/0178669 A1 | 7/2011 | Tanaka et al. |
| 2011/0246015 A1 | 10/2011 | Cummings et al. |
| 2011/0264427 A1 | 10/2011 | Shumaker et al. |
| 2011/0282523 A1 | 11/2011 | Shue |
| 2011/0282622 A1 | 11/2011 | Canter |
| 2012/0078510 A1 | 3/2012 | Ma et al. |
| 2012/0083945 A1 | 4/2012 | Oakley et al. |
| 2012/0106800 A1 | 5/2012 | Khan et al. |
| 2012/0127030 A1 | 5/2012 | Arthur et al. |
| 2012/0154277 A1 | 6/2012 | Bar-Zeev et al. |
| 2012/0203450 A1 | 8/2012 | Meyer et al. |
| 2012/0213436 A1 | 8/2012 | Grindstaff et al. |
| 2012/0237085 A1 | 9/2012 | Meier |
| 2012/0245844 A1 | 9/2012 | Lommel et al. |
| 2012/0281503 A1 | 11/2012 | Rikoski |
| 2012/0290146 A1 | 11/2012 | Dedes et al. |
| 2013/0009950 A1 | 1/2013 | Ben-David et al. |
| 2013/0050180 A1 | 2/2013 | Bruemmer |
| 2013/0231779 A1 | 9/2013 | Purkayastha et al. |
| 2013/0308822 A1 | 11/2013 | Marimon et al. |
| 2013/0338856 A1 | 12/2013 | Yelland et al. |
| 2014/0032013 A1 | 1/2014 | Riley |
| 2014/0032034 A1* | 1/2014 | Raptopoulos ........ G08G 5/0069 701/25 |
| 2014/0056438 A1 | 2/2014 | Baalu et al. |
| 2014/0163781 A1 | 6/2014 | Vian et al. |
| 2014/0222248 A1 | 8/2014 | Levien et al. |
| 2014/0249693 A1 | 9/2014 | Stark et al. |
| 2014/0277854 A1 | 9/2014 | Jones et al. |
| 2014/0350839 A1 | 11/2014 | Pack et al. |
| 2015/0128823 A1 | 5/2015 | Akcasu et al. |
| 2015/0148988 A1 | 5/2015 | Fleck |
| 2015/0212391 A1 | 7/2015 | Waibel et al. |
| 2015/0269438 A1 | 9/2015 | Samarasekera et al. |
| 2015/0350614 A1 | 12/2015 | Meier et al. |
| 2015/0379874 A1 | 12/2015 | Ubhi et al. |
| 2016/0068267 A1 | 3/2016 | Liu et al. |
| 2016/0070264 A1 | 3/2016 | Hu et al. |
| 2016/0070265 A1 | 3/2016 | Liu et al. |
| 2016/0216710 A1 | 7/2016 | Hu et al. |
| 2016/0217698 A1 | 7/2016 | Liu et al. |
| 2016/0225264 A1 | 8/2016 | Taveira |
| 2016/0273921 A1 | 9/2016 | Zhou et al. |
| 2016/0273922 A1 | 9/2016 | Stefan |
| 2017/0052541 A1 | 2/2017 | Hu et al. |

FOREIGN PATENT DOCUMENTS

| | | |
|---|---|---|
| CN | 101445156 A | 6/2009 |
| CN | 201331348 Y | 10/2009 |
| CN | 201331349 Y | 10/2009 |
| CN | 101650891 A | 2/2010 |
| CN | 101667036 A | 3/2010 |
| CN | 101762805 A | 6/2010 |
| CN | 101802738 A | 8/2010 |
| CN | 101867868 A | 10/2010 |
| CN | 101950027 A | 1/2011 |
| CN | 101952737 A | 1/2011 |
| CN | 102023003 A | 4/2011 |
| CN | 102362141 A | 2/2012 |
| CN | 102393747 A | 3/2012 |
| CN | 102460074 A | 5/2012 |
| CN | 102621987 A | 8/2012 |
| CN | 102707724 A | 10/2012 |
| CN | 102749927 A | 10/2012 |
| CN | 102854887 A | 1/2013 |
| CN | 202815124 U | 3/2013 |
| CN | 103256931 A | 8/2013 |
| CN | 103323002 A | 9/2013 |
| CN | 103365299 A | 10/2013 |
| CN | 203397214 U | 1/2014 |
| CN | 203397215 U | 1/2014 |
| CN | 103576690 A | 2/2014 |
| CN | 103744430 A | 4/2014 |
| CN | 103914077 A | 7/2014 |
| CN | 103925920 A | 7/2014 |
| CN | 103941748 A | 7/2014 |
| CN | 103941750 A | 7/2014 |
| CN | 103970143 A | 8/2014 |
| CN | 103984357 A | 8/2014 |
| CN | 104115082 A | 10/2014 |
| EP | 0588360 A1 | 3/1994 |
| EP | 2177966 A2 | 4/2010 |
| EP | 2515147 A2 | 10/2012 |
| EP | 2592436 A2 | 5/2013 |
| JP | H02241421 A | 9/1990 |
| JP | H-08241123 A | 9/1996 |
| JP | H-08273100 A | 10/1996 |
| JP | H11282530 A | 10/1999 |
| JP | 2003127994 A | 5/2003 |
| JP | 2008304260 A | 12/2008 |
| JP | 2009041932 A | 2/2009 |
| JP | 2010095246 A | 4/2010 |
| JP | 2010095247 A | 4/2010 |
| JP | 2012140101 A | 7/2012 |
| JP | 2014002603 A | 1/2014 |
| JP | 2014002604 A | 1/2014 |
| JP | 2014041601 A | 3/2014 |
| WO | 2003004352 A1 | 1/2003 |
| WO | WO-2009091431 A1 | 7/2009 |
| WO | WO-2009118043 A1 | 10/2009 |
| WO | WO-2011120141 A1 | 10/2011 |
| WO | WO-2013163746 A1 | 11/2013 |
| WO | WO-2014108026 A1 | 7/2014 |

OTHER PUBLICATIONS

Notice of allowance dated Jan. 6, 2017 for U.S. Appl. No. 14/801,599.

Notice of allowance dated Jan. 20, 2017 for U.S. Appl. No. 15/088,551.

Notice of allowance dated Jan. 26, 2017 for U.S. Appl. No. 15/088,551.

Notice of allowance dated Feb. 10, 2017 for U.S. Appl. No. 14/801,640.

Notice of allowance dated Feb. 10, 2017 for U.S. Appl. No. 15/088,645.

Bills, et al. Autonomous MAV flight in indoor environments using single image perspective cues. 2011 IEEE International Conference on Robotics and Automation (ICRA). May 9-13, 2011; 5776-5783. DOI:10.1109/ICRA.2011.5980136.

Co-pending U.S. Appl. No. 15/277,455, filed Sep. 27, 2016.

Corke, et al. An Introduction to Inertial and Visual Sensing. The International Journal of Robotics Research 2007 26: 519-535. DOI: 10.1177/0278364907079279.

European search report—partial dated Feb. 22, 2016 for EP Application No. 13828970.

European search report and opinion dated Jul. 6, 2016 for EP Application No. 14889182.

Extended European search report and opinion dated Aug. 3, 2016 for EP Application No. 13828970.

International search report and written opinion dated May 26, 2015 for PCT/CN2014/086005.

International search report and written opinion dated May 29, 2015 for PCT/CN2014/086006.

International search report and written opinion dated Jun. 10, 2015 for PCT/CN2014/086007.

International search report and written opinion dated Sep. 15, 2014 for PCT/CN2013/088971.

Masone, et al. Semi-autonomous Trajectory Generation for Mobile Robots with Integral Haptic Shared Control, In Proc. 2014 IEEE Intl Conference on Robotics and Automation, pp. 6468-6475, Jun. 7, 2014.

Merchant. Image information needed for autonomous systems, Proc. SPIE 5807, Automatic Target Recognition XV, 261 (May 23, 2005); doi:10.1117/12.605794.

Notice of allowance dated Mar. 22, 2016 for U.S. Appl. No. 14/801,599.

(56) References Cited

OTHER PUBLICATIONS

Notice of allowance dated Mar. 28, 2016 for U.S. Appl. No. 14/801,640.
Notice of allowance dated May 24, 2016 for U.S. Appl. No. 14/801,640.
Notice of allowance dated Jun. 27, 2016 for U.S. Appl. No. 14/801,599.
Notice of allowance dated Jul. 13, 2016 for U.S. Appl. No. 14/801,640.
Notice of allowance dated Aug. 9, 2016 for U.S. Appl. No. 15/088,551.
Notice of allowance dated Oct. 3, 2016 for U.S. Appl. No. 15/088,645.
Notice of allowance dated Dec. 1, 2016 for U.S. Appl. No. 14/801,599.
Notice of allowance dated Dec. 2, 2016 for U.S. Appl. No. 14/801,640.
Notice of allowance dated Dec. 9, 2016 for U.S. Appl. No. 15/088,645.
Office action dated May 12, 2016 for U.S. Appl. No. 14/814,159.
Office action dated May 16, 2016 for U.S. Appl. No. 14/845,894.
Office action dated May 16, 2016 for U.S. Appl. No. 15/088,551.
Office action dated Jun. 8, 2016 for U.S. Appl. No. 15/088,645.
Office action dated Oct. 22, 2015 for U.S. Appl. No. 14/814,159.
Office action dated Oct. 28, 2015 for U.S. Appl. No. 14/801,640.
Office action dated Nov. 17, 2015 for U.S. Appl. No. 14/801,599.
Office action dated Dec. 21, 2016 for U.S. Appl. No. 14/236,315.
Ross, et al. Multi-Sensor 3D image Fusion and interactive search. Information Fusion, 2000. FUSION 2000. Proceedings of the Third International Conference on. vol. 1. IEEE, 2000.
Sanfourche, et al. Perception for UAV: Vision-based navigation and environment modeling. Journal Aerospace Lab 4 (2012): 1-19.
Serranoa, et al. Seamless indoor-outdoor navigation for unmanned multi-sensor aerial platforms. The International Archives of Photogrammetry, Remote Sensing and Spatial Information SciencesMar. 5, 2014; XL-3/W1:115-122.
Soloviev, et al. Tight coupling of GPS, laser scanner, and inertial measurements for navigation in urban environments. 2008 IEEE/ION Position, Location and Navigation Symposium. IEEE, 2008. 511-525.
Thrun, et al. Integrating grid-based and topological maps for mobile robot navigation. In Proceedings of the National Conference on Artificial Intelligence. Portland, Oregon. Aug. 1996; (pp. 944-951).
U.S. Appl. No. 14/236315, filed Jan. 30, 2014.
U.S. Appl. No. 15/088,551, filed Apr. 1, 2016.
U.S. Appl. No. 15/088,645, filed Apr. 1, 2016.
Evan Dill et al., Seamless Indoor-Outdoor Navigation for Unmanned Multi-Sensor Aerial Platforms, In Position, Loration and Navigation Symposium—PLANS 2014, 2014 IEEE/ION, pp. 1174-1182.
Fengchun Zhu, Research on Navigation and Environment Modeling of Mobile Robot, Dissertation of Doctor of Philosophy, College of Information and Electrical Engineering, Shandong University of Science and Technology, May 2007, 150 Pages.
United States Patent and Trademark Office (USPTO), Notice of Allowance for U.S. Appl. No. 14/814,159, dated May 4, 2017.
Parra, et al. Visual odometry and map fusion for GPS navigation assistance. In Industrial Electronics (ISIE), Jun. 2011 IEEE International Symposium on (pp. 832-837). IEEE.
T. Krajnik, et al., AR-Drone as a Platform for Robotic Research and Education, in Proc. International Conference of Research and Education in Robotics—Eurobot 2011, Prague, Czech Republic, Jun. 2011, pp. 172-186.
United States Patent and Trademark Office (USPTO), Notice of Allowance for U.S. Appl. No. 14/814,159, dated Apr. 12, 2017.
The European Patent Office (EPO), EP Search Report and Search Opinion 14901421.9, dated Mar. 20, 2017.
The World Intellectual Property Organziation (WIPO), International Search Report and Written Opinion PCT/CN2014/086006, dated May 29, 2015.
The World Intellectual Property Organziation (WIPO), International Search Report and Written Opinion PCT/CN2014/086007, dated Jun. 10, 2015.
United States Patent and Trademark Office (USPTO), Office Action for U.S. Appl. No. 14/236,315, dated Jul. 27, 2017.

* cited by examiner

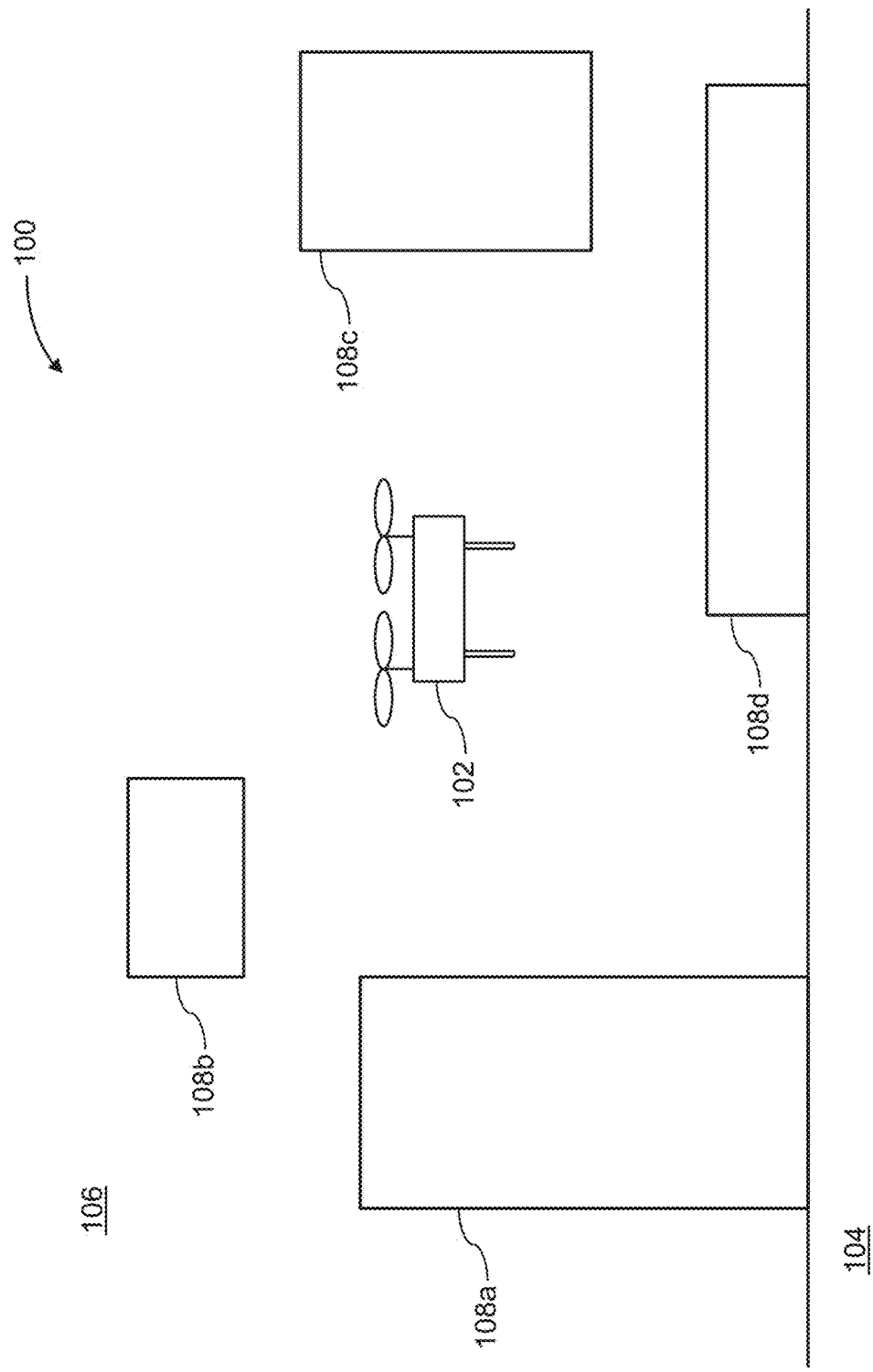

CONTEXT-BASED FLIGHT MODE SELECTION

CROSS-REFERENCE

This application is a continuation of U.S. patent application Ser. No. 15/088,645, filed Apr. 1, 2016, which is a continuation application of U.S. patent application Ser. No. 14/801,640, filed Jul. 16, 2015, which is a continuation of International Application No. PCT/CN2014/086006, filed on Sep. 5, 2014. The above-referenced applications are hereby incorporated by reference.

BACKGROUND

Unmanned vehicles such as unmanned aerial vehicles can be used for performing surveillance, reconnaissance, and exploration tasks in a wide variety of environments for military and civilian applications. An unmanned aerial vehicle may be manually controlled by a remote user, or may operate in a semi-autonomous or fully autonomous manner. Various control schemes can be implemented to enable operation of an unmanned aerial vehicle within an environment with varying degrees of autonomy.

However, existing control schemes for unmanned aerial vehicles may not be optimal in some instances. For example, some control schemes may rely upon the user's own judgment to determine optimal operating parameters for the unmanned aerial vehicle, which may be difficult for inexperienced users or in situations where the user cannot accurately perceive the environment surrounding the unmanned aerial vehicle. Additionally, some control schemes may not provide safety mechanisms for automatically detecting and/or predicting collisions with obstacles, sensor malfunctions, or other error situations that may be encountered during operation of the unmanned aerial vehicle.

SUMMARY

Improved control schemes for operating unmanned aerial vehicles are needed. The embodiments disclosed herein permit an unmanned aerial vehicle to be controlled according to a determined flight mode. A flight mode may be associated with a set of operating rules for controlling the unmanned aerial vehicle. In some embodiments, the flight mode is automatically selected based on data (e.g., environmental information, state information for the unmanned aerial vehicle) obtained by one or more sensors on the unmanned aerial vehicle. Each flight mode may provide different control schemes for operating the unmanned aerial vehicle, such as different obstacle avoidance strategies, thereby enhancing adaptability, safety, and ease of use.

Thus, in one aspect, a system for controlling an unmanned aerial vehicle within an environment is provided. The system can comprise: one or more sensors carried by the unmanned aerial vehicle and configured to provide sensor data and one or more processors. The one or more processors can be individually or collectively configured to: determine, based on the sensor data, an environment type for the environment; select a flight mode from a plurality of different flight modes based on the environment type, wherein each of the plurality of different flight mode is associated with a different set of operating rules for the unmanned aerial vehicle; and cause the unmanned aerial vehicle to operate within the environment while conforming to the set of operating rules of the selected flight mode.

In some embodiments, the environment type can comprise one or more of: an indoor environment, an outdoor environment, a high altitude environment, or a low altitude environment. The environment types can be differentiated based on altitude of the unmanned aerial vehicle, an amount of structures surrounding the unmanned aerial vehicle, and/or a distance of the unmanned aerial vehicle from a user controlling the unmanned aerial vehicle.

In some embodiments, the one or more sensors can comprise one or more of: a GPS sensor, an inertial sensor, a vision sensor, a lidar sensor, an ultrasonic sensor, a barometer, or an altimeter. The one or more sensors can comprise a plurality of different sensor types. The one or more sensors can comprise a GPS sensor and the environment type can be determined based on a number of GPS satellites in communication with the GPS sensor. The one or more sensors can comprise a lidar sensor and the environment type can be determined based on time-of-flight data obtained by the lidar sensor. The one or more sensors can comprise a vision sensor and the environment type can be determined based on image data obtained by the vision sensor, such as an exposure time associated with the image data obtained by the vision sensor.

In some embodiments, the plurality of different flight modes can comprise two or more of: an indoor flight mode, an outdoor flight mode, a high altitude flight mode, a low altitude flight mode, a fully autonomous flight mode, a semi-autonomous flight mode, or a manual flight mode. Each set of operating rules can comprise processing rules for processing data obtained by the one or more sensors. The processing rules can be used for performing sensor fusion of the data obtained by the one or more sensors. Alternatively or in combination, each set of operating rules can comprise control rules for controlling flight of the UAV. The control rules can be used to determine obstacle avoidance strategies for the UAV.

In another aspect, a method of controlling an unmanned aerial vehicle within an environment is provided. The method can comprise: receiving sensor data from one or more sensors carried by the unmanned aerial vehicle; determining, based on the sensor data and with aid of a processor, an environment type for the environment; selecting a flight mode from a plurality of different flight modes based on the environment type and with aid of the processor, wherein each of the plurality of different flight modes is associated with a different set of operating rules for the unmanned aerial vehicle; and causing the unmanned aerial vehicle to operate within the environment while conforming to the set of operating rules of the selected flight mode.

In another aspect, a system for controlling an unmanned aerial vehicle within an environment is provided. The system can comprise: one or more sensors carried by the unmanned aerial vehicle and configured to provide sensor data and one or more processors. The one or more processors can be individually or collectively configured to: select a flight mode from a plurality of different flight modes, wherein each of the plurality of different flight modes is associated with a different obstacle avoidance strategy; receive a signal indicating a desired movement path for the unmanned aerial vehicle; receive a signal from the one or more sensors detecting one or more obstacles situated along or near the desired movement path; and modify the desired movement path based on the obstacle avoidance strategy associated with the selected flight mode in order to prevent the unmanned aerial vehicle from colliding with the one or more obstacles.

In some embodiments, the one or more sensors can comprise one or more of: a GPS sensor, an inertial sensor, a vision sensor, a lidar sensor, an ultrasonic sensor, a barometer, or an altimeter. The one or more sensors can comprise a plurality of different sensor types.

In some embodiments, the plurality of different flight modes can comprise two or more of: an indoor flight mode, an outdoor flight mode, a high altitude flight mode, a low altitude flight mode, a fully autonomous flight mode, a semi-autonomous flight mode, or a manual flight mode. The flight mode can be selected based on sensor data obtained by the one or more sensors. The sensor data can comprise environmental information relating to an environment in which the unmanned aerial vehicle is located and/or information relating to a state of the unmanned aerial vehicle. The flight mode can be selected based on a user input command.

In some embodiments, at least one of the obstacle avoidance strategies can comprise causing the unmanned aerial vehicle to hover in place at a specified distance from the one or more obstacles and/or navigate around the one or more obstacles. The signal indicating the desired movement path can be received from a remote controller operated by a user of the unmanned aerial vehicle.

In some embodiments, the one or more processors are further configured to transmit warning information to a user indicating a potential collision with the one or more obstacles. The one or more processors can be further configured to cause the unmanned aerial vehicle to navigate along the modified desired movement path, thereby avoiding the one or more obstacles.

In some embodiments, the system can further comprise a display unit configured to display a graphical representation of spatial disposition of the one or more obstacles relative to the unmanned aerial vehicle.

In another aspect, a method of controlling an unmanned aerial vehicle is provided. The method can comprise: selecting a flight mode from a plurality of different flight modes, wherein each of the plurality of different flight modes is associated with a different obstacle avoidance strategy; receiving a signal indicating a desired movement path for the unmanned aerial vehicle; detecting one or more obstacles along the desired movement path using one or more sensors; and modifying the desired movement path based on the obstacle avoidance strategy associated with the selected flight mode in order to prevent the unmanned aerial vehicle from colliding with the one or more obstacles.

In another aspect, a system for controlling an unmanned aerial vehicle is provided. The system can comprise: one or more sensors carried by the unmanned aerial vehicle and configured to provide sensor data and one or more processors. The one or more processors can be individually or collectively configured to: determine, using data from the one or more sensors, that the unmanned aerial vehicle is within a first environment type; select a first flight mode from a plurality of different flight modes based on the first environment type, wherein each of the plurality of different flight modes is associated with a different set of operating rules for the unmanned aerial vehicle; cause the unmanned aerial vehicle to operate while conforming to the set of operating rules of the first flight mode; detect, using data from the one or more sensors, that the unmanned aerial vehicle is within a second environment type; select a second flight mode from the plurality of different flight modes based on the second environment type; and cause the unmanned aerial vehicle to operate while conforming to the set of operating rules of the second flight mode.

In some embodiments, the environment type can comprise one or more of: an indoor environment, an outdoor environment, a high altitude environment, or a low altitude environment. The environment types can be differentiated based on altitude of the unmanned aerial vehicle, an amount of structures surrounding the unmanned aerial vehicle, and/or a distance of the unmanned aerial vehicle from a user controlling the unmanned aerial vehicle.

In some embodiments, the one or more sensors can comprise one or more of: a GPS sensor, an inertial sensor, a vision sensor, a lidar sensor, an ultrasonic sensor, a barometer, or an altimeter. The one or more sensors can comprise a plurality of different sensor types. The one or more sensors can comprise a GPS sensor and the environment type can be determined based a number of GPS satellites in communication with the GPS sensor. The one or more sensors can comprise a lidar sensor and the environment type can be determined based on time-of-flight data obtained by the lidar sensor. The one or more sensors can comprise a vision sensor and the environment type can be determined based on image data obtained by the vision sensor, such as an exposure time associated with the image data obtained by the vision sensor.

In some embodiments, the plurality of different flight modes can comprise two or more of: an indoor flight mode, an outdoor flight mode, a high altitude flight mode, a low altitude flight mode, a fully autonomous flight mode, a semi-autonomous flight mode, or a manual flight mode.

In another aspect, a method of controlling an unmanned aerial vehicle is provided. The method can comprise: determining, using one or more sensors and with aid of a processor, that the unmanned aerial vehicle is within a first environment type; selecting a first flight mode from a plurality of different flight modes based on the first environment type and with aid of the processor, wherein each of the plurality of different flight modes is associated with a different set of operating rules for the unmanned aerial vehicle; causing the unmanned aerial vehicle to operate while conforming to a first set of operating rules of the first flight mode; detecting, using the one or more sensors and with aid of the processor, that the unmanned aerial vehicle is within a second environment type; selecting a second flight mode from the plurality of different flight modes based on the second environment type and with aid of the processor; and causing the unmanned aerial vehicle to operate while conforming to a second set of operating rules of the second flight mode.

It shall be understood that different aspects of the invention can be appreciated individually, collectively, or in combination with each other. Various aspects of the invention described herein may be applied to any of the particular applications set forth below or for any other types of movable objects. Any description herein of an aerial vehicle may apply to and be used for any movable object, such as any vehicle. Additionally, the systems, devices, and methods disclosed herein in the context of aerial motion (e.g., flight) may also be applied in the context of other types of motion, such as movement on the ground or on water, underwater motion, or motion in space. Furthermore, any description herein of a rotor or rotor assembly may apply to and be used for any propulsion system, device, or mechanism configured to generate a propulsive force by rotation (e.g., propellers, wheels, axles).

Other objects and features of the present invention will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 1A illustrates an unmanned aerial vehicle in an outdoor environment, in accordance with embodiments;

DETAILED DESCRIPTION

Figure 1B:
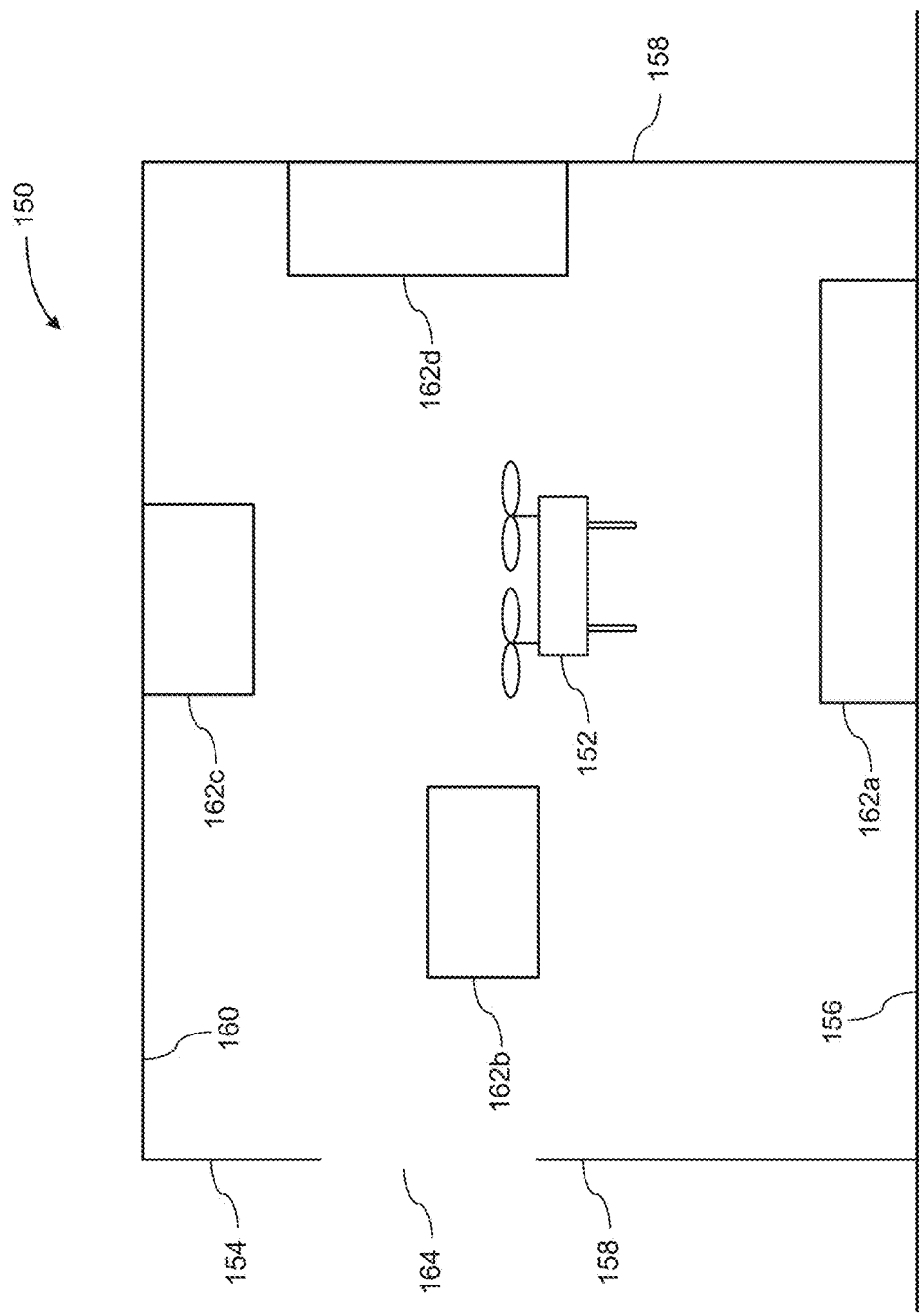
FIG. 1B illustrates an unmanned aerial vehicle in an indoor environment, in accordance with embodiments.

The present disclosure provides improved systems and methods for controlling the operation of unmanned aerial vehicles (UAVs). In some embodiments, a UAV can be controlled (e.g., manually, semi-autonomously, or fully autonomously) according to a selected flight mode. The term "flight mode" may be used herein to refer to a control scheme for operating a UAV. A flight mode can include a set of operating rules for the UAV state (e.g., position, orientation, velocity, acceleration), functionality (e.g., collision avoidance, fault detection), and/or behavior (e.g., response to user command, degree of autonomy). The flight mode can be determined automatically, e.g., based on environmental data collected by one or more sensors carried by the UAV. Advantageously, the embodiments described herein can be used to automatically and dynamically optimize the operating rules for the UAV by selecting an appropriate flight mode based on the current environmental context, thereby enhancing the safety, user convenience, and adaptability of the UAV.

For example, a UAV can be configured to operate in a short range flight mode or a long range flight mode. Each flight mode can be associated with operating rules that are appropriate for when the UAV is relatively close to or far from the user, respectively. For instance, a short range flight mode may provide operating rules that afford a greater degree of control to the user, whereas a long range flight mode may provide operating rules that utilize automated control mechanisms, such as autonomous obstacle avoidance strategies. Based on the detected distance between the UAV and the user, the onboard processors of the UAV can select the appropriate flight mode to be used to control UAV operation.

The UAVs described herein can be operated autonomously (e.g., by a suitable computing system such as an onboard controller), semi-autonomously, or manually (e.g., by a human user). The UAV can receive commands from a suitable entity (e.g., human user or autonomous control system) and respond to such commands by performing one or more actions. For example, the UAV can be controlled to take off from the ground, move within the air (e.g., with up to three degrees of freedom in translation and up to three degrees of freedom in rotation), hover within the air, land on the ground, and so on. As another example, the UAV can be controlled to move at a specified velocity and/or acceleration (e.g., with up to three degrees of freedom in translation and up to three degrees of freedom in rotation) or along a specified movement path. Furthermore, the commands can be used to control one or more UAV components, such as the components described herein (e.g., sensors, actuators, propulsion units, payload, etc.). For instance, some commands can be used to control the position, orientation, and/or operation of a UAV payload such as a camera.

A UAV can be operated in various types of environments, such as outdoor, indoor, high altitude, low altitude, urban, rural, and so on. Different types of environments may be differentiated from each other based on various environmental characteristics and/or conditions. For example, outdoor and indoor environments can be differentiated based on the degree to which the environment is enclosed (e.g., by walls, ceilings, roofs, and other structures), as described in greater detail below. As another example, high and low altitude environments can be differentiated based on a predetermined distance threshold, such as the distance from the ground. An environment less than or equal to approximately 10 m or 50 m from the ground may be considered to be a low altitude environment, whereas an environment greater than or equal to approximately 10 m or 50 m from the ground may be considered to be a high altitude environment. Similarly, short and long range environments can be differentiated based on a predetermined distance threshold, such as the distance from the user controlling the UAV and/or the starting point for the UAV flight. A short range environment may be less than or equal to approximately 50 m from the user and/or starting point, whereas a long range environment may be greater than or equal to 50 m from the user and/or starting point. In some embodiments, environment types can be differentiated based on the amount, type, density, etc. of objects (e.g., natural or manmade structures, obstacles, or other entities) within the environment. For instance, an urban or suburban environment may be characterized by having a high density of manmade structures and human beings, whereas a rural environment may be characterized by having a high density of natural structures and few human beings. Other characteristics that may be used to distinguish between different environment types include weather conditions (e.g., wind speed, visibility, precipitation), terrain (e.g., mountainous, forested, over water), amount of human activity (e.g., high populated, less populated, unpopulated), amount of aerial activity (e.g., due to birds, aircraft, other aerial vehicles), proximity to safety hazards (e.g., power lines, buildings, restricted air spaces such as airports), and so on.

Turning now the drawings, FIG. 1A illustrates a UAV 102 operating in an outdoor environment 100, in accordance with embodiments. The outdoor environment 100 may be an urban, suburban, or rural setting, or any other environment that is not at least partially within a building. The UAV 102 may be operated relatively close to the ground 104 (e.g., low altitude) or relatively far from the ground 104 (e.g., high altitude). For example, a UAV 102 operating less than or equal to approximately 10 m from the ground may be considered to be at low altitude, while a UAV 102 operating at greater than or equal approximately 10 m from the ground may be considered to be at high altitude.

In some embodiments, the outdoor environment 100 includes one or more obstacles 108a-d. An obstacle may include any object or entity that may obstruct the movement of the UAV 102. Some obstacles may be situated on the ground 104 (e.g., obstacles 108a, 108d), such as buildings, ground vehicles (e.g., cars, motorcycles, trucks, bicycles), human beings, animals, plants (e.g., trees, bushes), and other manmade or natural structures. Some obstacles may be in contact with and/or supported by the ground 104, water, manmade structures, or natural structures. Alternatively, some obstacles may be wholly located in the air 106 (e.g., obstacles 108b, 108c), including aerial vehicles (e.g., airplanes, helicopters, hot air balloons, other UAVs) or birds. Aerial obstacles may not be supported by the ground 104, or by water, or by any natural or manmade structures. An obstacle located on the ground 104 may include portions that extend substantially into the air 106 (e.g., tall structures such as towers, skyscrapers, lamp posts, radio towers, power lines, trees, etc.).

FIG. 1B illustrates a UAV 152 operating in an indoor environment 150, in accordance with embodiments. The indoor environment 150 is within the interior of a building 154 having a floor 156, one or more walls 158, and/or a ceiling or roof 160. Exemplary buildings include residential, commercial, or industrial buildings such as houses, apartments, offices, manufacturing facilities, storage facilities, and so on. The interior of the building 154 may be completely enclosed by the floor 156, walls 158, and ceiling 160 such that the UAV 152 is constrained to the interior space. Conversely, at least one of the floor 156, walls 158, or ceiling 160 may be absent, thereby enabling the UAV 152 to fly from inside to outside, or vice-versa. Alternatively or in combination, one or more apertures 164 may be formed in the floor 156, walls 158, or ceiling 160 (e.g., a door, window, skylight).

Similar to the outdoor environment 100, the indoor environment 150 can include one or more obstacles 162a-d. Some obstacles may be situated on the floor 156 (e.g., obstacle 162a), such as furniture, appliances, human beings, animals, plants, and other manmade or natural objects. Conversely, some obstacles may be located in the air (e.g., obstacle 162b), such as birds or other UAVs. Some obstacles in the indoor environment 150 can be supported by other structures or objects. Obstacles may also be attached to the ceiling 160 (e.g., obstacle 162c), such as light fixtures, ceiling fans, beams, or other ceiling-mounted appliances or structures. In some embodiments, obstacles may be attached to the walls 158 (e.g., obstacle 162d), such as light fixtures, shelves, cabinets, and other wall-mounted appliances or structures. Notably, the structural components of the building 154 can also be considered to be obstacles, including the floor 156, walls 158, and ceiling 160.

The obstacles described herein may be substantially stationary (e.g., buildings, plants, structures) or substantially mobile (e.g., human beings, animals, vehicles, or other objects capable of movement). Some obstacles may include a combination of stationary and mobile components (e.g., a windmill). Mobile obstacles or obstacle components may move according to a predetermined or predictable path or pattern. For example, the movement of a car may be relatively predictable (e.g., according to the shape of the road). Alternatively, some mobile obstacles or obstacle components may move along random or otherwise unpredictable trajectories. For example, a living being such as an animal may move in a relatively unpredictable manner. Different types of environments may be associated with different amounts and types of obstacles. For example, a high altitude environment may have few or no obstacles. In contrast, an indoor environment or a low altitude environment may have more obstacles. Some types of low altitude, outdoor environments (e.g., fields and other flat, open spaces) may have fewer obstacles than other types (e.g., urban settings and other highly populated areas, forests). Accordingly, a UAV operating within an environment with a high obstacle density may be exposed to an increased risk of collisions, near-misses, or other safety incidents. Conversely, UAV operation within a low obstacle density environment may be relatively safe. Mobile obstacles may pose an increased risk compared to stationary obstacles, as mobile obstacles may collide with or obstruct the UAV independently of any action taken by the UAV.

A UAV can be operated within various environments in accordance with one or more operating rules. As previously described herein, the operating rules can be used to control any suitable aspect of UAV operation, such as UAV state, functionality, and/or behavior. In some embodiments, one or more operating rules may provide ranges, limits, values, and the like for one or more aspects of the state of the UAV (e.g., altitude, latitude, longitude, roll, pitch, yaw, translational velocity, angular velocity, translational acceleration, angular acceleration, etc.). As another example, one or more operating rules may provide algorithms, logic, processes, and the like for implementing one or more UAV functionalities (e.g., collision avoidance, fault detection, safety mechanisms, navigation, mapping, data collection, data processing, etc.). For instance, the operating rules may define obstacle avoidance strategies for the UAV, as described in further detail below. Alternatively or in combination, exemplary operating rules may provide algorithms, logic, processes, and the like for controlling one or more aspects of UAV behavior (e.g., response to user commands, response to detected obstacles, response to errors or malfunctions, autonomous or semi-autonomous operation, etc.).

A set of one or more operating rules can be used to define a control scheme for a UAV, also known as a "control mode" or "flight mode." Different flight modes may provide different sets of operating rules for controlling a UAV. For instance, a "low velocity flight mode," "medium velocity flight mode," and "high velocity flight mode" may include operating rules permitting UAV flight within low, medium, or high velocity ranges, respectively. As another example, the extent to which the user controls the UAV may vary between different flight modes. For instance, a "free flight mode" or "manual flight mode" may include operating rules that permit the user to control the UAV with little or no automated intervention. In a free flight mode, input commands provided by a user may be used to directly control one or more UAV components (e.g., propulsion system, actuators, sensors, etc.). As an example, the user may directly control the position, orientation, velocity, and/or acceleration of the UAV with respect to up to six degrees of freedom of movement. Conversely, a "fully autonomous flight mode" may include operating rules that control the UAV independently of any user input. A fully autonomous flight mode may utilize an automated control system to control the position, orientation, velocity, and/or acceleration of the UAV with respect to up to six degrees of freedom of movement and without using any user input. For instance, an "autonomous return flight mode" can control the UAV to return to a specified location (e.g., the initial takeoff location) without any control inputs from the user. The autonomous return mode may be triggered when it is determined that the UAV has lost control of the UAV (e.g., the UAV is out of range of the remote controller or otherwise loses communication with the remote controller). A "semi-autonomous flight mode" may include operating rules that utilize any suitable combination of user commands and automatically generated instructions to control the UAV. In a semi-autonomous flight mode, some aspects of UAV operation may be automated, while others may rely upon user input. For example, a "waypoint flight mode" can permit a user to indicate a sequence of target locations or "waypoints" for the UAV to traverse (e.g., input using a remote controller, mobile device, etc.). The UAV can autonomously determine a flight path between the waypoints and then navigate according the flight path.

The operating rules of a flight mode can be configured as desired. Some flight modes may be optimized for certain operating conditions (e.g., in terms of safety, ease of use, maneuverability, functionality such as aerial photography and other types of data collection) and may be differentiated from other flight modes on that basis. In some embodiments, a flight mode may be designed to provide optimal UAV performance in a certain environment type. For instance, a "low altitude flight mode" or "short range flight mode" may be associated with a set of operating rules optimized for use in low altitude and/or short range environments. Conversely, a "high altitude flight mode" or "long range flight mode" may be configured for high altitude and/or long range environments. Similarly, an "indoor flight mode," "outdoor flight mode," "urban flight mode," or "rural flight mode" can be designed to enhance UAV performance for the corresponding environment type. The appropriate operating rules may be determined in any suitable manner, e.g., based on analysis of previous flight data, machine learning, feedback from test users, etc.

The UAVs described herein can be configured to operate according to a plurality of different flight modes, simultaneously and/or sequentially. Any suitable number and combination of different flight modes can be used, such as one, two, three, four, five, or more different flight modes. For instance, during a single flight, a UAV may utilize several different flight modes, each associated with a different set of operating rules. In some embodiments, the UAV can simultaneously utilize a plurality of different flight modes. The flight modes may each be associated with a predetermined priority, such that the operating rules of a prioritized flight mode take precedence over the operating rules of a less-prioritized flight mode in situations where the two conflict. The UAV may switch between different flight modes according to a predetermined sequence. Alternatively, the flight mode(s) used can be dynamically determined during UAV operation.

Various approaches can be used to determine an appropriate flight mode for controlling a UAV, including manual, semi-autonomous, or fully autonomous methods. For instance, a user may provide input commands (e.g., via a remote controller or mobile device) in order to select a flight mode and/or to change between different flight modes. Alternatively or in combination, other factors can be used to determine the flight mode, such as the state of the UAV or components thereof (e.g., spatial disposition, phase of operation such as takeoff or landing, percentage of power remaining, malfunctions), the state of other objects near the UAV (e.g., presence of obstacles, structures, other UAVs), a function to be performed by the UAV (e.g., data collection, navigation), and so on. In some embodiments, flight mode determination can be performed in an automated manner with little or no user input, thereby relieving the user of the responsibility associated with selecting an optimal flight mode. This may be advantageous for inexperienced users or in situations where the user is unable to accurately determine an appropriate flight mode (e.g., when the user cannot directly see the UAV and/or the environment around the UAV). Furthermore, automated flight mode selection can be used in some instances to adjust or override erroneous user input, thereby improving UAV operation and safety. For example, certain flight modes may restrict user inputs that could lead to hazardous situations (e.g., flying the UAV too close to obstacles).

In some instance, the current environment of the UAV may influence the selection of the flight mode. Some flight modes may be more optimal compared to other flight modes in certain environment types, as described above. For instance, flight modes implementing more stringent safety features such as automated collision avoidance may be appropriate in environments that are out of the visual range of the user and/or have a relatively large number of obstacles. Conversely, flight modes that provide the user with relatively unconstrained control of the UAV may be desirable when operating in an unobstructed environment within the visual range of the user. Accordingly, suitable methods may be implemented to assess the environment surrounding the UAV so as to determine an appropriate flight mode for UAV operation.

Figure 2:
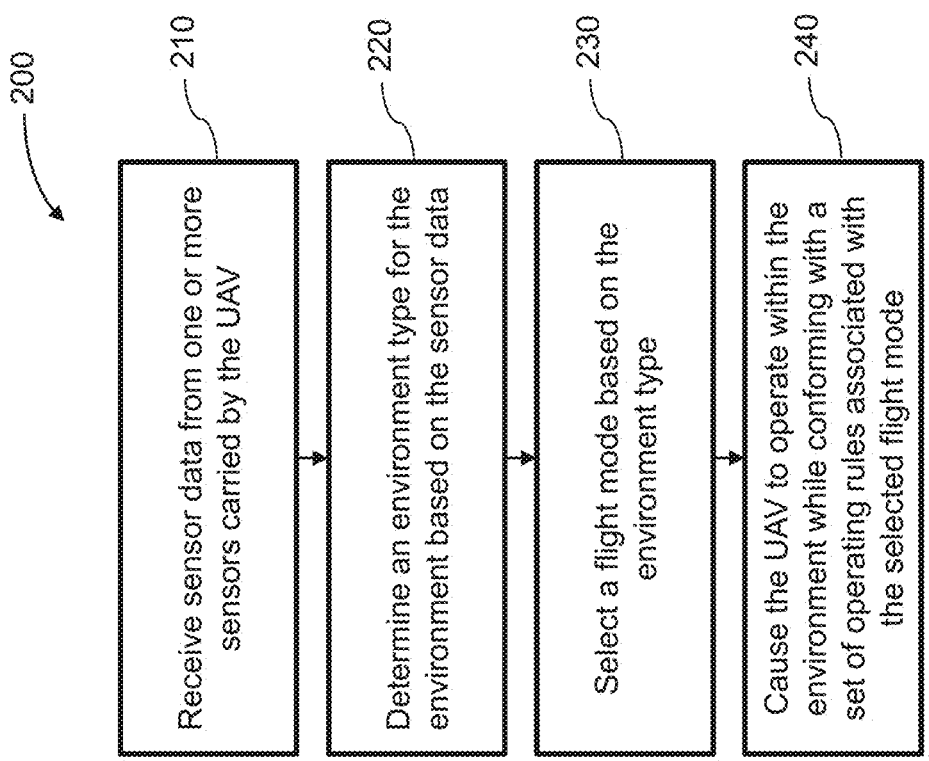
FIG. 2 illustrates a method for controlling an unmanned aerial vehicle in an environment, in accordance with embodiments.

FIG. 2 illustrates a method 200 for selecting a flight mode for controlling a UAV within an environment, in accordance with embodiments. The method 200, as with all methods presented herein, can be practiced using any embodiment of the systems and devices described herein. For example, one or more steps of the method 200 can be performed by one or more processors, acting individually or collectively. Some of the processors may be carried by the UAV (e.g., on-board processors). Alternatively or in combination, some of the processors may be in communication with the UAV from a remote location (e.g., a remote computing system or device). In some embodiments, a remote device can be a remote controller that accepts one or more user inputs to control one or more components of another device (e.g., the UAV or portions thereof, a display unit, or other external devices), as described in further detail herein. The method 200 can be performed in a fully automated manner without requiring any user input or manual intervention. Alternatively, at least some of the steps of the method 200 can be performed based on received user input. In some embodiments, some or all of the steps of the method 200 are performed in real-time during operation of the UAV, thereby providing real-time context-based selection of the UAV flight mode.

In step 210, sensor data of the environment is received from one or more sensors. Any sensor suitable for collecting environmental information can be used, including location sensors (e.g., global positioning system (GPS) sensors, mobile device transmitters enabling location triangulation), vision sensors (e.g., imaging devices capable of detecting visible, infrared, or ultraviolet light, such as cameras), proximity sensors (e.g., ultrasonic sensors, lidar, time-of-flight cameras), inertial sensors (e.g., accelerometers, gyroscopes, inertial measurement units (IMUs)), altitude sensors, pressure sensors (e.g., barometers), audio sensors (e.g., microphones) or field sensors (e.g., magnetometers, electromagnetic sensors). Any suitable number and combination of sensors can be used, such as one, two, three, four, five, or more sensors. Optionally, the data can be received from sensors of different types (e.g., two, three, four, five, or more types). Sensors of different types may measure different types of signals or information (e.g., position, orientation, velocity, acceleration, proximity, pressure, etc.) and/or utilize different types of measurement techniques to obtain data. For instance, the sensors may include any suitable combination of active sensors (e.g., sensors that generate and measure energy from their own source) and passive sensors (e.g., sensors that detect available energy).

The sensor data may provide various types of environmental information. For example, the sensor data may be indicative of an environment type, such as an indoor environment, outdoor environment, low altitude environment, high altitude environment, etc. Exemplary methods for determining an environment type based on sensor data are provided below. The sensor data may also provide information regarding current environmental conditions, including weather (e.g., clear, rainy, snowing), visibility conditions, wind speed, time of day, and so on. Furthermore, the environmental information collected by the sensors may include information regarding the objects in the environment, such as structures or obstacles.

In some embodiments, at least some of the sensors may be configured to provide data regarding a state of the UAV. The state information provided by a sensor can include information regarding a spatial disposition of the UAV (e.g., position information such as longitude, latitude, and/or altitude; orientation information such as roll, pitch, and/or yaw). The state information can also include information regarding motion of the UAV (e.g., translational velocity, translation acceleration, angular velocity, angular acceleration, etc.). A sensor can be configured, for instance, to determine a spatial disposition and/or motion of the UAV with respect to up to six degrees of freedom (e.g., three degrees of freedom in position and/or translation, three degrees of freedom in orientation and/or rotation). The state information may be provided relative to a global reference frame or relative to the reference frame of another entity. For example, a sensor can be configured to determine the distance between the UAV and the user and/or the starting point of flight for the UAV.

The sensors described herein can be carried by the UAV. A sensor can be situated on any suitable portion of the UAV, such as above, underneath, on the side(s) of, or within a vehicle body of the UAV. Some sensors can be mechanically coupled to the UAV such that the spatial disposition and/or motion of the UAV correspond to the spatial disposition and/or motion of the sensors. The sensor can be coupled to the UAV via a rigid coupling, such that the sensor does not move relative to the portion of the UAV to which it is attached. Alternatively, the coupling between the sensor and the UAV can permit movement of the sensor relative to the UAV. The coupling can be a permanent coupling or non-permanent (e.g., releasable) coupling. Suitable coupling methods can include adhesives, bonding, welding, and/or fasteners (e.g., screws, nails, pins, etc.). Optionally, the sensor can be integrally formed with a portion of the UAV. Furthermore, the sensor can be electrically coupled with a portion of the UAV (e.g., processing unit, control system, data storage) so as to enable the data collected by the sensor to be used for various functions of the UAV (e.g., navigation, control, propulsion, communication with a user or other device, etc.), such as the embodiments discussed herein.

In step 220, an environment type for the environment is determined based on the sensor data, which may also be referred to herein as "environmental recognition" or "environmental analysis." In some embodiments, data obtained by one or more sensors can be analyzed in order to determine various quantitative statistics and/or qualitative measures that are indicative of a particular environment type. The data processing and analysis methods used may vary based on the specific sensor type, as described in the exemplary embodiments below.

Figure 3:
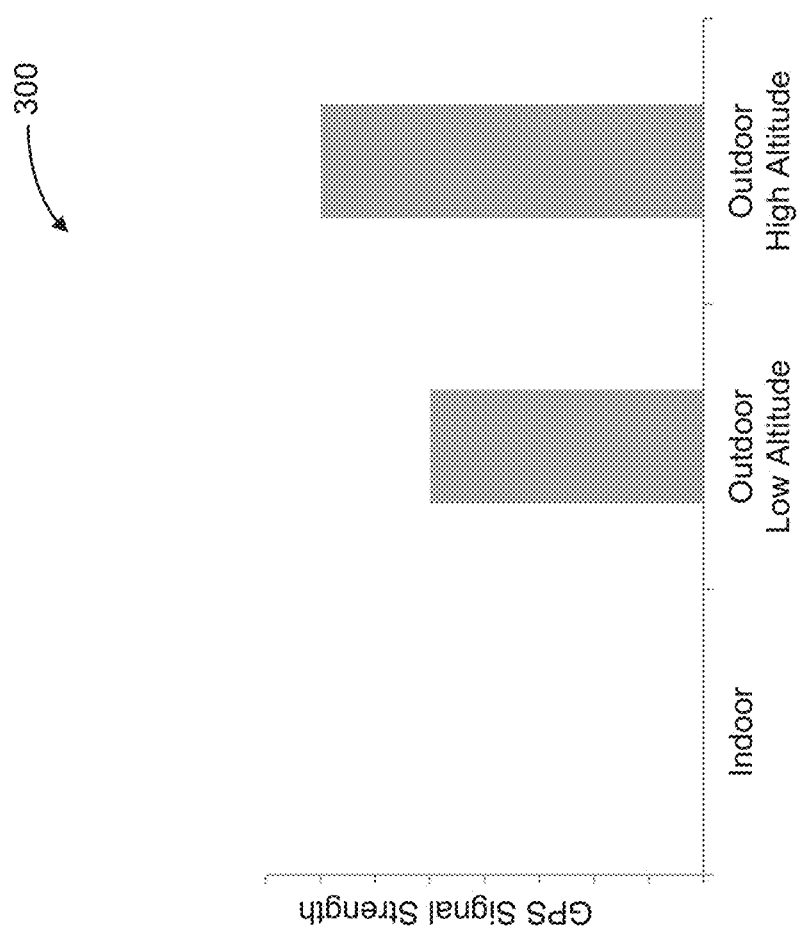
FIG. 3 illustrates a histogram showing determination of environment type based on GPS signal strength, in accordance with embodiments.

FIG. 3 illustrates a histogram 300 showing determination of environment type based on GPS signal strength, in accordance with embodiments. The strength of the GPS signal received by a GPS sensor may be dependent on the number of GPS satellites in communication with the GPS sensor. In an indoor environment, the GPS signal may be relatively weak (e.g., few or no satellites available) due to obstructed line of sight between the GPS sensor and the GPS satellites. Conversely, in an outdoor environment, the GPS signal may be relatively strong. Furthermore, the GPS signal may be stronger at higher altitudes compared to lower altitudes. Accordingly, the GPS signal strength can be used in some instances to determine whether the UAV is in an indoor environment, outdoor environment, low altitude environment, or high altitude environment. For example, if the GPS sensor is in communication with 4 or fewer GPS satellites, this may indicate that the UAV is in an indoor environment. Conversely, if the GPS sensor is in communication with 5 or more GPS satellites, this may indicate that the UAV is in an outdoor environment at a low altitude (e.g., less than 50 m from the ground). If the GPS sensor is in communication with 6 or more GPS satellites, this may indicate that the UAV is in an outdoor environment at a high altitude (e.g., more than 50 m from the ground).

Figure 4:
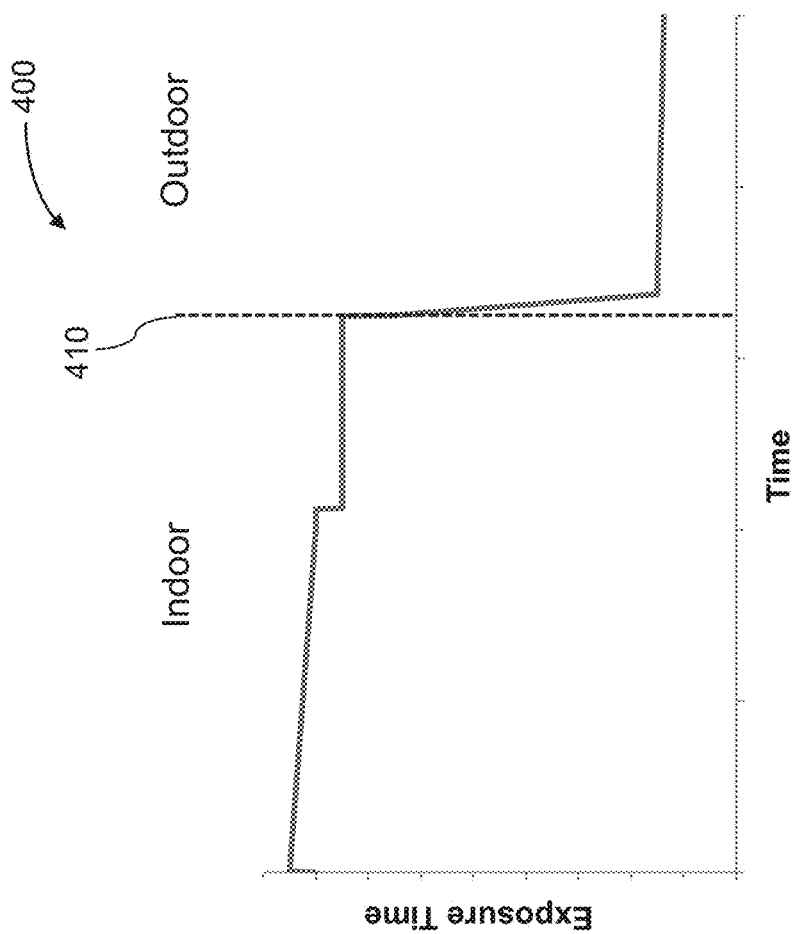
FIG. 4 illustrates a graph showing determination of environment type based on exposure time, in accordance with embodiments.

FIG. 4 illustrates a graph 400 showing determination of environment type based on exposure time, in accordance with embodiments. A vision sensor such as a camera may automatically determine an optimal exposure time for image data based on the brightness of the surrounding environment. Brighter environments may be associated with shorter exposure times, whereas darker environments may be associated with longer exposure times. The relative brightness of an environment can be used in some instances to distinguish between outdoor and indoor environments. For instance, an outdoor environment may be brighter than an indoor environment during daytime. Conversely, during nighttime, an indoor environment may be brighter than an outdoor environment. Accordingly, the exposure time can be used to determine whether the UAV is indoors and outdoors. In the graph 400, the measured exposure time for the vision sensor decreases sharply at time point 410, which may indicate that the UAV has moved from an indoor environment to a daytime outdoor environment. During daytime, the exposure time for a vision sensor may be within a range from 5 ms to 10 ms when the UAV is outdoors. The exposure time may not vary significantly with time of day for an indoor environment. For instance, the exposure time may be within a range from 20 ms to 30 ms when the UAV is indoors.

Other types of sensor data can also be used to determine the environment type. For instance, position sensors (e.g., GPS sensors, altimeters) and/or pressure sensors (e.g., barometers) can be used determine the altitude of the UAV, and thereby distinguish between low and high altitude environments. Similarly, position sensors can also be used to measure the distance between the UAV and the starting point and/or user, and thereby determine whether the UAV is in a short range environment or a long range environment. In some instances, time-of-flight data from proximity sensors such as lidar can be used determine the amount of structures near the UAV, which may correlate to the environment type (e.g., indoor and/or low altitude environments may include more structures than outdoor and/or high altitude environments). Furthermore, suitable image recognition techniques can be applied to image data obtained from vision sensors in order to distinguish between different environments. For example, image recognition can be used to identify environmental objects that are indicative of a certain environment type (e.g., trees indicating a rural environment, buildings and people indicating an urban environment).

In order to improve the accuracy of environmental recognition, results from multiple sensor types can be compared and/or combined to generate a final sensing result. The results from each sensor can be accorded different weights depending on the quality and reliability of the sensor data. Additionally, sensor data obtained over a specified time interval can be compared (e.g., based on calculated statistics) and/or combined (e.g., using weighted averages) in order to produce improved environmental recognition results. For instance, in embodiments where environmental recognition is performed using image data, the data analysis can be performed once per frame of image data ("frame-based environmental analysis"), and the results obtained at each of a plurality of successive image frames can be compared and/or combined in order to obtain the final result. This approach may improve the accuracy and noise resistance of environmental recognition techniques.

In step 230, a flight mode is selected based on the environment type. The flight mode can be selected from a plurality of different flight modes, each associated with a different set of operating rules, as previously described herein. Any suitable method can be used to determine an appropriate flight mode for the environment type. In some instances, certain flight modes may be optimized for certain environment types and may therefore be preferentially selected when the corresponding environment type is recognized. For example, the operating rules for a flight mode may define obstacle avoidance strategies that are configured for a particular environment type. Exemplary obstacle avoidance strategies for various environment types are described in further detail below.

Alternatively or in combination, other factors can also be considered in flight mode selection, such as user preference (e.g., based on input commands received from a remote controller or other device), phase of operation (e.g., take off, landing), presence of other objects in the environment (e.g., obstacles, structures, other UAVs), or the state of the UAV or components thereof (e.g., position, orientation, remaining battery life). Optionally, if the environment type cannot be determined (e.g., due to erroneous, inadequate, or unreliable sensor data), the flight mode selection can be performed independently of the environment type, or the UAV may operate according to a default flight mode (e.g., manual flight mode).

In step 240, the UAV is caused to operate within the environment while conforming to a set of operating rules associated with the selected flight mode. The operating rules may apply when the UAV is being controlled manually, semi-autonomously, or fully autonomously. For instance, the UAV may receive a signal (e.g., an input command from a user, a control instruction from an automated control system) indicating a desired movement for the UAV (e.g., a desired translation, rotation, velocity, and/or acceleration). One or more onboard processors of the UAV (or any other suitable system or device provided herein) can determine whether the UAV can move as instructed by the received signal while complying with the operating rules. If so, the processors can generate control instructions that are transmitted to the UAV propulsion system in order to cause the UAV to execute the movement. If not, the processors can modify the signal so that the resultant movement is in compliance with the operating rules and provide the corresponding instructions to the propulsion system. Furthermore, one or more of the sensors previously described herein can be used to measure the current state of the UAV and provide feedback to the UAV control system to ensure that the operating rules are continuously obeyed. Various techniques can be applied to reduce the noise of the sensor measurements so as to improve the stability of UAV control, such as filtering, sensor fusion (e.g., using Kalman filters), time-averaging, and so on.

In some embodiments, the operating rules can be used to generate commands for controlling the UAV. For example, the operating rules can control UAV behavior, such as by causing the UAV to perform an appropriate evasive maneuver in response to a detected environmental obstacle, as described in further detail below. As another example, the operating rules can control the functioning of one or more UAV components. In embodiments where the UAV vehicle body is equipped with one or more lights (e.g., to provide a visual indicator of UAV status), the operating rules may specify an appropriate brightness level for the lights based on the environment type to optimize visibility and power consumption (e.g., brighter when in an outdoor environment to improve visibility, dimmer when in an indoor environment to reduce power consumption). In yet another example, the operating rules can include processing rules that control how the UAV processes sensor data. For instance, in embodiments, the operating rules of the current flight mode may indicate how sensor data from multiple sensor types should be fused to optimize the reliability of the sensor fusion result. This approach may be advantageous in situations where the reliability of some sensor types varies according to the environment type (e.g., GPS data is less accurate in indoor environments than in outdoor environments, magnetometers are influenced by environments with electric field such as indoor environments, etc.). The UAV may implement different data processing rules according to the predicted sensor reliability for the current environment type.

Although the above steps show method 200 of controlling a UAV in accordance with embodiments, a person of ordinary skill in the art will recognize many variations based on the teachings described herein. Some of the steps may comprise sub-steps. In some embodiments, step 220 is optional, such that in step 230 the flight mode is determined based on the sensor data without considering the environmental type. Many of the steps may be repeated as often as is beneficial. For example, steps 210, 220, 230, and 240 can be repeated continuously or at predetermined time intervals during the operation of the UAV so as to provide dynamic and adaptive determination of the flight mode. Furthermore, although the method 200 is presented in terms of flight mode determination, in alternative embodiments the method 200 can also be used to determine one or more operating rules based on the environment type and independently from any flight mode selection. For instance, in some embodiments, step 230 can be modified to permit selection of a set of operating rules from a plurality of different sets of operating rules. Any description herein pertaining to determination of flight modes can also be applied to determination of operating rules, and vice-versa.

In some embodiments, it may be advantageous for a UAV to switch between different flight modes during operation. For instance, the user may instruct the UAV (e.g., via a user device such as a remote controller or mobile device) to switch between flight modes. Alternatively, flight mode switching can be achieved in a semi-autonomous or fully autonomous manner. Automated flight mode switching may be performed based environmental information such as environment type, state of the UAV or components thereof, phase of operation, detected safety risks such as malfunctions and/or obstacles, or suitable combinations thereof. For example, if collected sensor data indicates that the UAV has moved out of a first environment type and into a second, different environment type, the current flight mode can be switched to a different mode that is more optimal for the second environment type. Embodiments of the flight mode switching methods described herein may advantageously permit UAV operating rules to be dynamically and adaptively determined based on the current operating conditions and/or user preferences.

Figure 5:
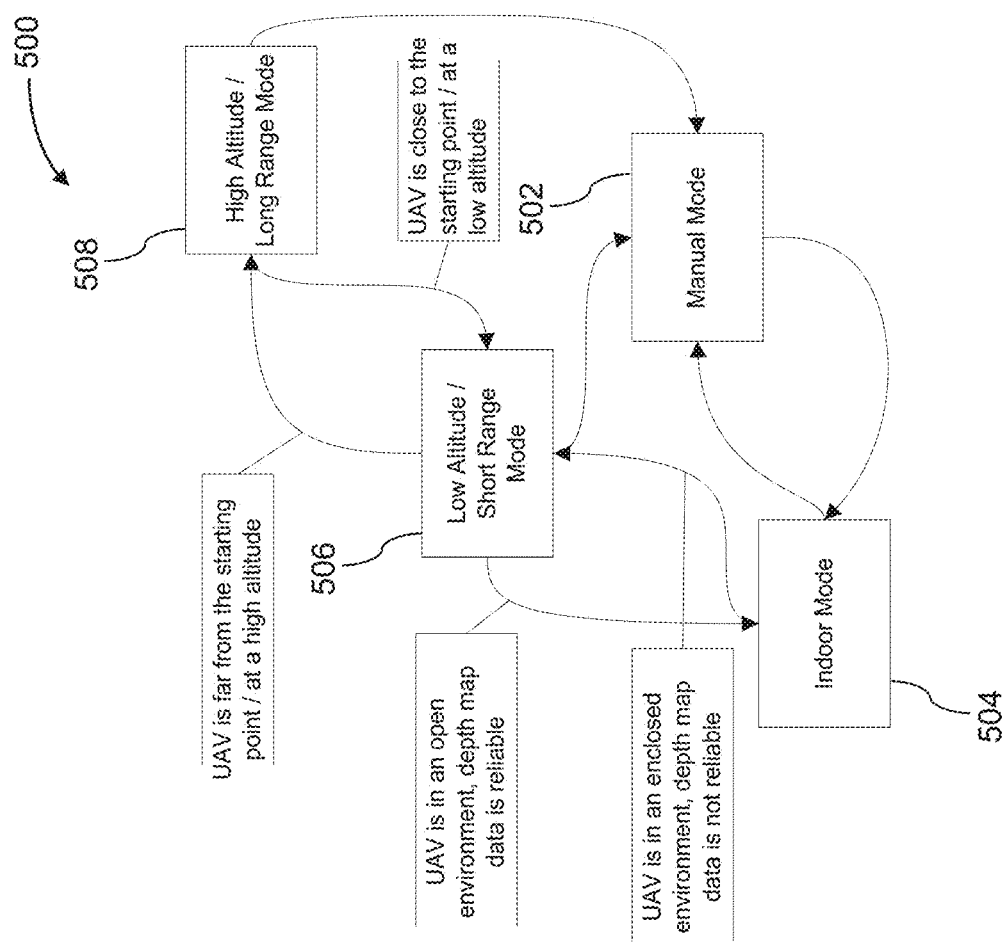
FIG. 5 is a block diagram illustrating a scheme for switching between a plurality of different flight modes, in accordance with embodiments.

FIG. 5 is a block diagram illustrating a scheme 500 for switching between a plurality of different flight modes, in accordance with embodiments. The flight modes can include a manual flight mode 502, an indoor flight mode 504, a low altitude or short range flight mode 506, and a high altitude or long range flight mode 508. The UAV can switch between any two of these flight modes if certain criteria have been met. For instance, the UAV can initially be in manual mode 502 during takeoff, and can switch to indoor mode 504 if takeoff is successful and the UAV state is normal. Once in indoor mode 504, the UAV can switch to low altitude or short range mode 506 if the sensor data indicates that the UAV is in an open, outdoor environment, e.g., based on the proximity sensor depth map data, image sensor exposure time, GPS signal strength, and the like. Conversely, the UAV can switch from operating in low altitude mode or short range 506 to indoor mode 504 if the sensor data indicates that the UAV is within an enclosed, indoor environment, e.g., as indicated by low GPS signal strength, unreliable depth map data, image recognition of walls or other structures, and so on. The transition between low altitude or short range mode 506 and high altitude or long range mode 508 can be triggered by various factors, including whether the UAV altitude has exceeded a certain threshold, whether the UAV distance from the starting point and/or user has exceeded a certain threshold, etc. In some embodiments, the UAV can automatically switch from the current flight mode to manual mode 502 if a malfunction is detected, e.g., using the methods provided below.

The flight modes described herein can be used to control various aspects of UAV operation. In some embodiments, some flight modes may influence how the UAV responds to certain situations, such as detection of a potential collision with one or more environmental obstacles. Different flight modes may provide operating rules defining different types of obstacle avoidance strategies. Obstacle avoidance strategies may be optimized for particular operating situations and/or environment types in order to mitigate the risk of collision without unduly interfering with user control of the UAV.

Figure 6:
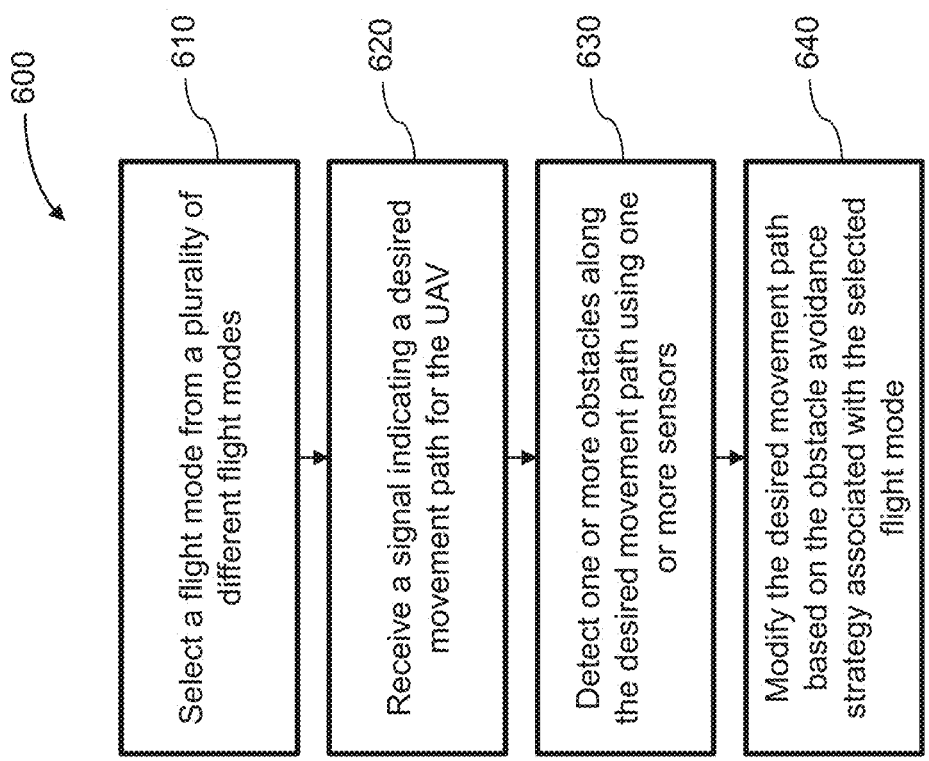
FIG. 6 illustrates a method for avoiding a collision with one or more obstacles, in accordance with embodiments.

FIG. 6 illustrates a method 600 for avoiding a collision with one or more obstacles, in accordance with embodiments. One or more steps of the method 600 can be performed by any embodiment of the systems and devices provided herein, such as by one or more processors.

In step 610, a flight mode is selected from a plurality of different flight modes. The selection of the flight mode can be based on a detected environment type, as previously described herein. Conversely, the flight mode can be selected independently of the environment type, e.g., based on a user input, the UAV state, phase of operation, obstacle type, etc. Each flight mode can include a set of operating rules that define a desired obstacle avoidance strategy, such that each flight mode is associated with a different obstacle avoidance strategy.

For instance, a "manual obstacle avoidance strategy" may be designed to minimize interference with user control of the UAV, and thus may not provide any automated obstacle avoidance mechanisms. Accordingly, the user may be solely responsible for providing the appropriate input commands to prevent collisions. Optionally, warning signals or information can be displayed (e.g., via a user interface provided on a remote controller or other user device) to alert the user of a detected obstacle and/or provide suggestions regarding how to avoid the obstacle, as described in further detail below. This strategy can be utilized in flight modes designed to maximize user control, such as free or manual flight mode, and may be appropriate for experienced users and/or users operating a UAV in a relatively safe, obstacle-free environment.

As another example, a "no user input obstacle avoidance strategy" may provide automated anti-collision mechanisms only when the user is not currently inputting any commands for controlling the UAV (e.g., the user has released the joysticks of the UAV remote controller). If a potential collision is detected in this situation, the UAV can automatically perform one or more evasive maneuvers (e.g., hover in place or otherwise maintain a specified distance from the obstacle, move away from the obstacle) and alert the user. UAV control can be returned to the user once the user provides an input command (e.g., applies force to the remote controller joysticks). This strategy may be advantageous in conditions where the UAV is prone to drift due to poor GPS signal, such as indoor environments or crowded outdoor environments in which GPS line of sight is blocked (e.g., by buildings, trees, or other structures). For example, an indoor flight mode can include a set of operating rules implementing the no input obstacle avoidance strategy described herein.

In a further example, an "erroneous user input obstacle avoidance strategy" may provide automated anti-collision mechanisms even when the user is currently providing input commands for the UAV. The erroneous user input strategy may also encompass at least some of the features of the no input obstacle avoidance strategy described above. In some embodiments, if the user provides commands that would result in a collision (e.g., the user steers the UAV to fly towards an obstacle, the user fails to divert the UAV away from an obstacle), the UAV can override the user commands and automatically perform evasive maneuvers (e.g., hover in place, maintain a specified distance from the obstacle, move away from the obstacle, fly around the obstacle) to prevent the collision. Additionally, suitable warning information can be provided to alert the user to the detected obstacle and provide instructions for evading the obstacle. The UAV may assume control until the user corrects the erroneous input. For instance, control will not be returned if the user continues to instruct the UAV to fly towards an obstacle. In some instances, if the user continues to provide erroneous input for a specified period of time, the UAV may assume that the user is no longer in proper control and switch to a semi-autonomous or fully autonomous flight mode (e.g., automated return mode). Conversely, control can be returned once the user redirects the UAV to fly away from the obstacle. In some embodiments, if suitable sensor data is available (e.g., GPS data), a global navigation map can be displayed to the user that indicates the current spatial disposition of one or more obstacles relative to the UAV. The navigation map can be updated in real-time so as to provide visual guidance enabling the user to locate and avoid obstacles. The erroneous user input obstacle avoidance strategy may be beneficial for preventing accidents caused by erroneous user input due to user inexperience or inattentiveness. In some embodiments, this strategy may be implemented in a low altitude and/or short range flight mode.

An "erroneous input lock obstacle avoidance strategy" may be similar to the erroneous user input strategy described above, with the additional feature of preventing the user from entering input that would cause a collision. In embodiments where a joystick-based control scheme is used, the user can be physically prevented from inputting commands that would cause the UAV to fly towards an obstacle by locking the movement of the joystick along the corresponding direction. This strategy may be advantageous in situations where the user is unable to directly assess the state of the UAV and/or surrounding obstacles, such as when the UAV is outside of the visual range of the user. Such situations may be more likely to arise when the UAV is operating in a high altitude environment or long range environment. Accordingly, this strategy may be implemented in a high altitude and/or long range flight mode.

A "tunneling obstacle avoidance strategy" can be used to assist users in navigating the UAV through structurally complex environments. Examples of such environments include forests, caves, urban areas, and other areas in which the UAV may need to fly within close proximity of multiple obstacles in order to navigate. When a tunneling strategy is implemented, the user may only need to input a desired movement path, and the UAV will automatically modify the flight trajectory to avoid any obstacles encountered while moving along that direction. For instance, if the user directs the UAV to fly towards a group of obstacles, the UAV can automatically determine a path forward that route the UAV around the obstacles. This approach may permit the user to navigate the UAV within complex environments with relatively simple input commands, thereby improving ease of use and allowing the user to focus their attention on other aspects of UAV operation (e.g., controlling a camera for aerial photography). Accordingly, this approach may be implemented by flight modes configured for environments with many obstacles.

An "observation obstacle avoidance strategy" may be implemented to optimize UAV response to mobile obstacles. When the UAV detects an obstacle, it may hover in place and/or maintain a constant distance from the obstacle for a certain period of time. The UAV can then use one or more sensors to collect obstacle information such as motion information. Iterative learning techniques can then be applied to analyze the sensor data in order to determine the movement patterns of the obstacle, and thereby generate a prediction of how the obstacle will behave. Once the iterative learning is complete, the UAV can automatically design a movement trajectory to avoid the obstacle, based on the observed and/or predicted obstacle behavior. This strategy may be implemented by flight modes configured for environments with many mobile obstacles, such as urban environments.

A "fully autonomous obstacle avoidance strategy" may be used in conjunction with a semi-autonomous or fully autonomous flight mode in order to enable collision avoidance even when the UAV is being operated independently of user input. During autonomous flight, the UAV can generate a map of the surrounding environment and use the map to detect environmental obstacles. Based on the characteristics of the obstacles (e.g., spatial disposition, size, type, mobility), the UAV can automatically generate a movement path in accordance with the autonomous flight trajectory that avoids the obstacles. This strategy may be implemented by a fully autonomous or semi-autonomous flight mode such as a waypoint flight mode or autonomous return flight mode.

In step 620, a signal indicating a desired movement path for the UAV is received. The signal can be generated based on user input (e.g., received from a remote controller). Alternatively, the signal can be autonomously generated based on instructions provided by an automated control system. In some instances, the signal can be generated semi-autonomously (e.g., the user indicates a series of waypoints for the UAV, and the UAV automatically calculates a path to traverse the waypoints). The desired movement path can indicate a desired position and/or orientation for the UAV (e.g., with respect to up to six degrees of freedom). In some embodiments, the signal can provide instructions for UAV velocity and/or acceleration to cause it to move along a desired movement path. Optionally, the signal can instruct the UAV to maintain a current position and/or orientation (e.g., hover in place).

In step 630, one or more obstacles along the desired movement path are detected using one or more sensors. Any combination of the sensors described herein can be used to obtain data used for obstacle detection (e.g., vision sensors, lidar, ultrasonic, etc.). In some embodiments, the sensor data can first be pre-processed in order to remove noise and improve signal-to-noise ratio. For example, techniques such as distortion correction, horizon straightening, Gaussian filtering, contrast enhancement, etc. can be applied to image data. As another example, lidar point cloud data can be pre-processed using median filtering. In embodiments where multiple sensors are used, the data from each sensor can be combined using sensor fusion techniques. The combined data can be used to generate a two-dimensional or three-dimensional reconstruction (e.g., a point cloud, occupancy grid, disparity map) of the environment surrounding the UAV. The reconstruction can be analyzed to identify obstacles that are positioned at or near the movement path of the UAV or otherwise pose a collision risk, such as by feature extraction or pattern recognition techniques. Optionally, suitable machine learning algorithms can be implemented to perform obstacle detection. The obstacle detection results may provide information regarding the position, orientation, size, proximity, and/or type of each obstacle, as well as corresponding confidence information for the result.

In some embodiments, the step 610 can be performed in conjunction with the step 630, such that the flight mode can be determined using the sensor data obtained in step 630. For instance, the sensor data can also be processed to determine the environment type, as previously described herein, and the flight mode can be selected according to the environment type.

In step 640, the desired movement path is modified based on the obstacle avoidance strategy associated with the selected flight mode. Any embodiment of the flight modes and obstacle avoidance strategies presented herein can be used. For instance, depending on the specific flight mode and obstacle strategy, the UAV may respond to a detected obstacle by hovering in place, flying around the obstacle, flying away from the obstacle, maintaining a specified distance from the obstacle, alerting the user of the obstacle, preventing the user from entering commands that would cause collisions with the obstacle, or suitable combinations thereof.

The flight mode-based approaches described herein can be utilized in various aspects of UAV operation in order to improve adaptability and ease of use. Some flight modes can be optimized for specific UAV-based applications, such as data collection (e.g., aerial photography, surveillance, mapping) or navigation (e.g., automated or semi-automated flight, waypoint-based navigation, automated return). In some embodiments, one or more flight modes may be implemented as part of active and/or passive safety mechanisms for UAV operation. Active safety mechanisms may refer to mechanisms that predict, detect, and/or prevent safety incidents (e.g., collisions or near-misses with obstacles, malfunctioning of UAV components, etc.), whereas passive safety mechanisms may refer to mechanisms that respond to safety incidents that have occurred (e.g., airbags, parachutes). The use of active safety mechanisms can reduce the incidence of accidents in situations where the user fails to respond appropriately to imminent safety risks, such as due to inability to accurately observe the UAV state (e.g., when the UAV is out of the visual range of the user), inattention (e.g., the user is distracted or otherwise fails to notice the safety risk), erroneous user commands (e.g., the user instructs the UAV to fly towards an obstacle), and so on. In some embodiments, the UAV responses to a detected safety risk (e.g., potential collision, system malfunction) may vary based on the operating rules of the current flight mode.

Figure 7:
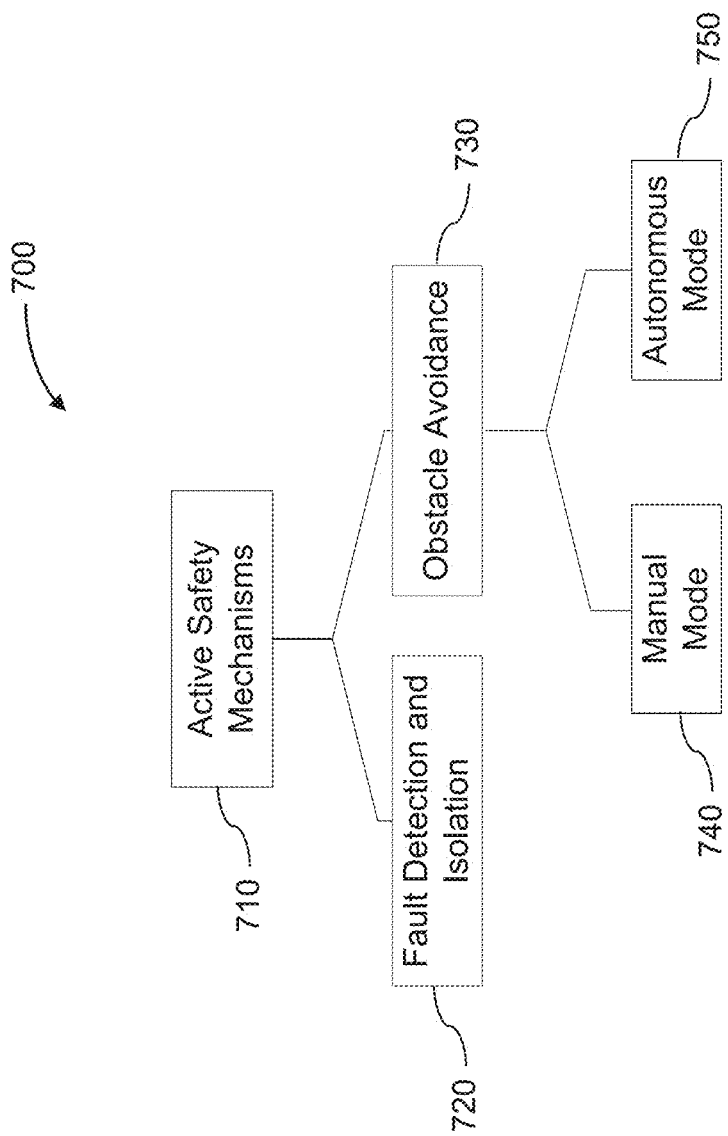
FIG. 7 illustrates a safety system for an unmanned aerial vehicle, in accordance with embodiments.

FIG. 7 illustrates a safety system 700 for a UAV, in accordance with embodiments. The system 700 can include a set of active safety mechanisms 710, although passive safety mechanisms can also be used in some embodiments. The active safety mechanisms 710 can include a fault detection and isolation mechanism 720 as well as an obstacle avoidance mechanism 730. The obstacle avoidance mechanism 730 can be based on one or more flight modes, such as a manual flight mode 740 and an autonomous flight mode 750. The safety system 700 can be used in combination with any of the embodiments described herein in order to improve the safety of UAV operation.

The fault detection and isolation mechanism 720 can be configured to detect the malfunctioning of one or more components of the UAV (e.g., sensors, actuators, controllers, transmitters, receivers) and perform diagnostics by identifying the type and source of the malfunction. In some embodiments, the mechanism 720 can be used to detect when one or more UAV sensors are producing erroneous data or failing to produce data, e.g., due to hardware and/or software abnormalities. The mechanism 720 can implement any suitable fault detection and isolation technique. For example, the mechanism 720 can use modeling to detect faults based on discrepancies between actual UAV state data and predicted UAV state data.

Figure 8:
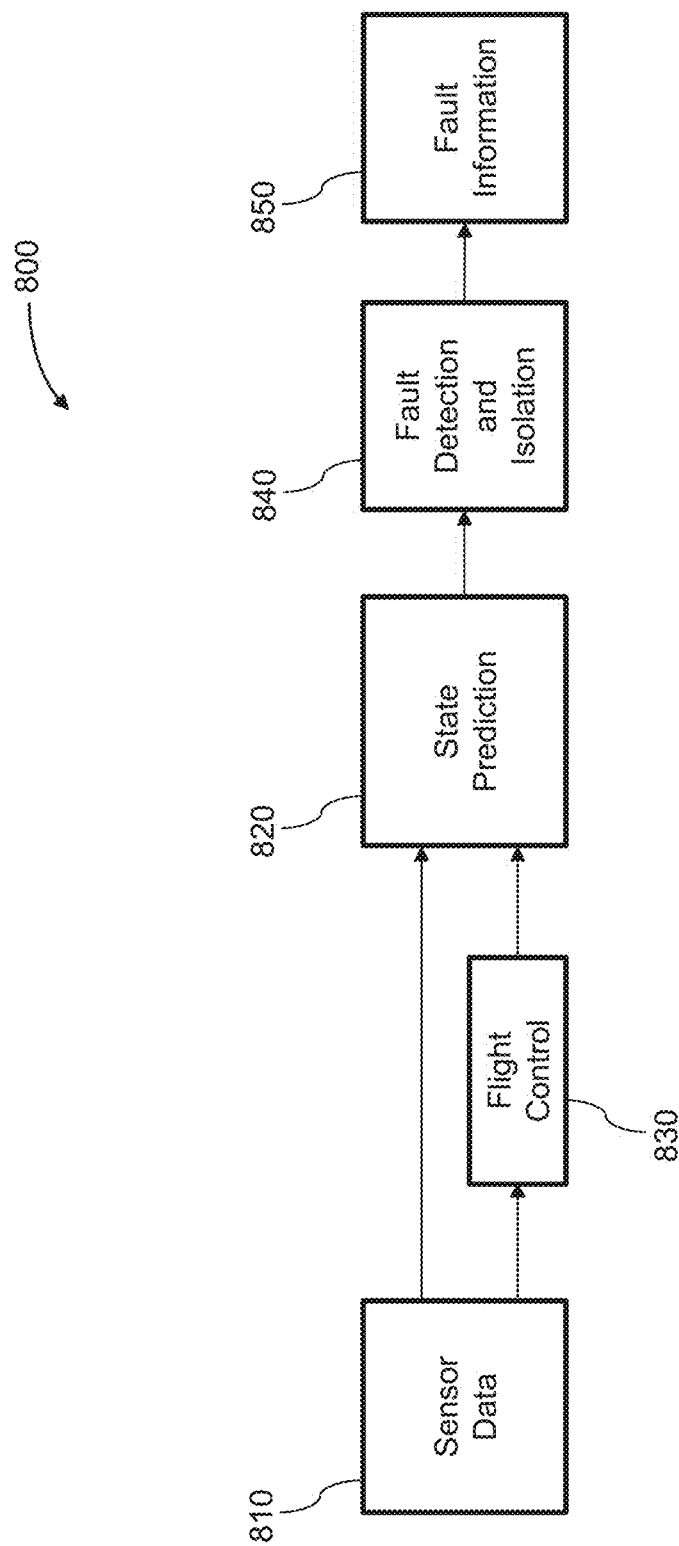
FIG. 8 is a block diagram illustrating a scheme for performing fault detection and isolation, in accordance with embodiments.

FIG. 8 is a block diagram illustrating a scheme 800 for performing fault detection and isolation, in accordance with many embodiments. The scheme 800 can be implemented by any embodiment of the systems and devices described herein, such as by one or more processors associated with the fault detection and isolation mechanism 720. In the scheme 800, sensor data 810 received from one or more UAV sensors can be used to generate a prediction of the UAV system state 820. The state prediction 820 may also depend on the flight control instructions 830 for the UAV, which in turn can be generated based on the received sensor data 810. The state prediction 820 can then be compared to the actual state of the UAV in order to perform fault detection and isolation 840. Substantial deviations between the predicted and actual states of the UAV may indicate the presence of a fault. The fault information 850 produced by the fault detection and isolation process can be output and/or used to determine a suitable UAV response.

In some embodiments, the predicted state data can be generated using a system model of the UAV, such as a state space model. For example, the UAV state $X_k$ (e.g., position, orientation, velocity, acceleration, battery level, etc.) at a current time interval k can be determined using the sensor data 810 and the current flight control instructions 830. A state space model for the predicting UAV state can be constructed as follows:

$$X_{(k+1|k)} = A \cdot X_{(k|k)} + B \cdot U_k + \alpha_k$$

where $X_{(k|k)}$ is the state vector at time k (having dimensions n×1), $X_{(k+1|k)}$ is the state vector at time k+1 predicted based on $X_{(k|k)}$ (having dimensions n×1), A is the system matrix (having dimensions n×n), B is the input matrix (having dimensions n×m), $U_k$ is the input vector (having dimensions m×1), and $\alpha_k$ is the system noise (having dimensions n×1). In some embodiments, the input vector $U_k$ may correspond to the flight control instructions 830 that are generated for controlling the UAV. The flight control instructions 830 can be determined based on user input, automatically generated by flight control algorithms based on the sensor data 810, or suitable combinations thereof.

The state prediction 820 can then be used to perform fault detection and isolation 840. In some embodiments, the UAV state at time k+1, $X_{k+1}$ can be obtained from the sensor data 810. The covariance matrix of the residual between the predicted state $X_{(k+1|k)}$ and the actual state $X_{k+1}$, $E_{k+1}$, can be calculated using the following relation:

$$E_{k+1} = (X_{k+1} - X_{(k+1|k)}) \cdot (X_{k+1} - X_{(k+1|k)})^T$$

The covariance matrix can be checked to determine whether any of the diagonal elements $E_{i,i}$ have a singular value ($E_{i,i}$>threshold). If no singular values are detected, this indicates that the current UAV state is normal. A singular value detected in the jth row of the covariance matrix indicates a fault in the jth value of the state vector $X_{k+1}$. In alternative embodiments, other approaches can be used to detect discrepancies between the state prediction 820 and the actual UAV state that are indicative of an abnormal system state. For example, various statistics such as the Mahalanobis distance, Euclidean distance, absolute value etc. can be computed and used to determine singular values. If a fault is detected, the abnormal state can be isolated, and the predicted state can be used as the current state to update the system model. The detected fault information 850 can then be used to determine an appropriate UAV response.

Referring again to FIG. 7, the obstacle avoidance mechanism 730 of the system 700 can be configured to detect a potential collision between the UAV and one or more obstacles in the environment, and subsequently generate an appropriate UAV response for preventing the collision. In some embodiments, the obstacle avoidance method can be specified by the operating rules of the current UAV flight mode, such that different flight modes are associated with different strategies for avoiding collisions. Any of the flight modes described herein can be used in conjunction with the obstacle avoidance mechanism 730. For example, the obstacle avoidance mechanism 730 can implement a manual flight mode 740 and an autonomous flight mode 750. The manual flight mode 740 can be configured to accept user commands for controlling the UAV and may implement relatively few or no automated intervention mechanisms. For instance, the manual flight mode 740 can implement a manual obstacle avoidance strategy, a no user input obstacle avoidance strategy, an erroneous user input obstacle avoidance strategy, or an erroneous input lock obstacle avoidance strategy. Conversely, the autonomous flight mode 750 can be configured to operate semi-autonomously or completely autonomously, such as an autonomous return flight mode or a waypoint flight mode. In some instances, the autonomous flight mode 750 can implement a fully autonomous obstacle avoidance strategy that provides automated UAV rerouting in response to detected obstacles.

In some instances, it may be beneficial to switch between the flight modes of the obstacle avoidance mechanism 730, e.g., from the manual flight mode 740 to the autonomous flight mode 750 or vice-versa. Flight mode switching can be performed based on detected environmental information such as an environment type, as previously described herein. Alternatively or in combination, the user can manually switch between the flight modes (e.g., by inputting a suitable command into a remote controller or other user device). For instance, the user can indicate a preference to switch from the manual flight mode 740 to the autonomous flight mode 750 or vice-versa. Furthermore, flight mode switching can be executed following a determination that one or more criteria have been fulfilled. For instance, if the UAV is in the manual flight mode 740 and is currently performing an automated obstacle avoidance maneuver (e.g., hovering in place) due to erroneous user input, if the user fails to provide appropriate input to correct the UAV flight path in a specified period of time (e.g., longer than approximately 3 s), the UAV may assume that the user no longer has proper control over the UAV and can automatically switch to the autonomous flight mode 750 to avoid collisions. Once the user provides appropriate input or otherwise indicates that proper control has been regained, the UAV can automatically switch back to the manual flight mode 740.

The safety mechanisms described herein can implement a suitable user interface in order to alert the user of any safety risks that are detected during UAV operation. In some embodiments, warning information or feedback indicative of a detected safety risk (e.g., a fault detected by the fault detection and isolation mechanism 720, an obstacle detected by the obstacle avoidance mechanism 730) can be provided to a user or operator of the UAV. The warning information can be provided as a visual indicator (e.g., a graphical indicator, warning text), an audible alarm (e.g., buzzer, siren, verbal instructions), haptic feedback (e.g., vibration), or suitable combinations thereof. Furthermore, the warning information can in some instances provide instructions to the user indicating how to respond appropriately to the safety risk. For example, upon detection of an obstacle near the UAV, the instructions can direct the user to input commands to steer the UAV away from or around the obstacle. As another example, upon detection of a fault or malfunction in one or more UAV components, the instructions can direct the user to land the UAV so that maintenance can be performed. The warning information can be presented to the user via a suitable user device, such as a remote controller, smartphone, tablet, laptop, personal computer, or other mobile device.

Figure 9:
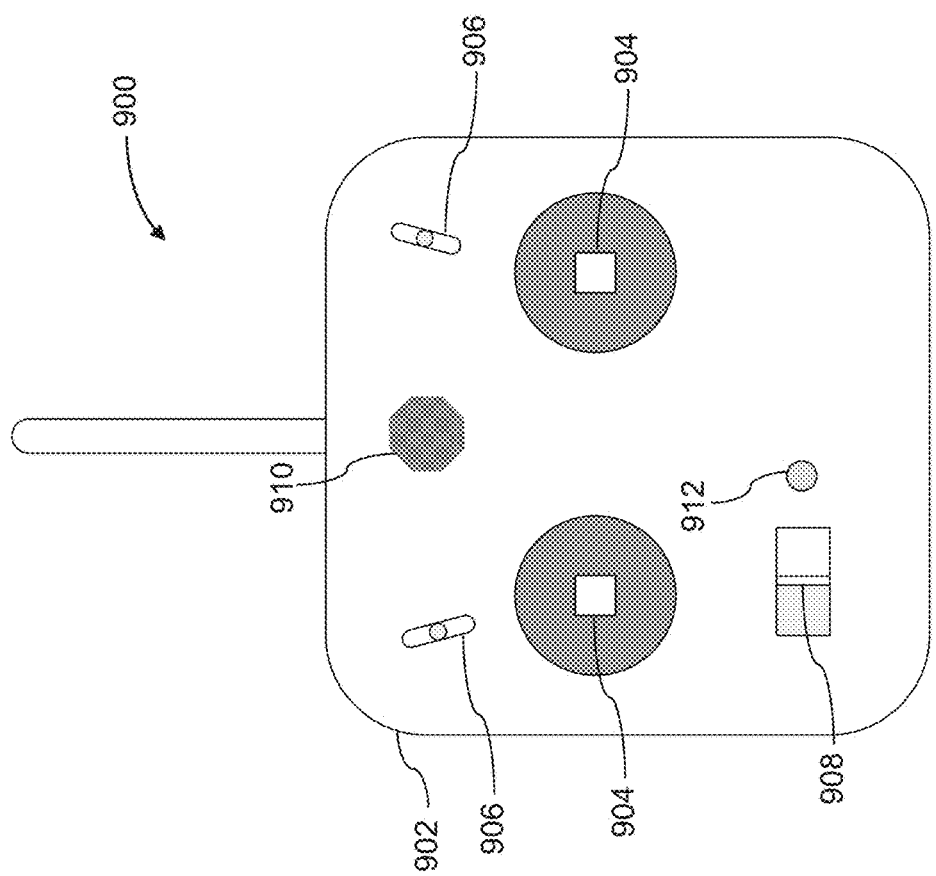
FIG. 9 illustrates a remote controller for a UAV, in accordance with embodiments.

FIG. 9 illustrates a remote controller 900 for a UAV, in accordance with many embodiments. The remote controller 900 can include one or more input mechanisms mounted on a controller body 902, such as one or more joysticks 904, one or more knobs 906, and/or one or more slide switches 908. The joysticks 904 can be used to input commands for controlling the position, orientation, and/or motion of the UAV. In some embodiments, the knobs 906 and/or slide switches 908 can be manipulated by a user to select a desired flight mode for operating the UAV, such as one or more of the flight modes described herein. For example, the user can turn the knobs 906 to a plurality of different positions in order to select one of a plurality of different available flight modes. As another example, the position of the slide switch 908 can also be used to indicate a user-selected flight mode.

Furthermore, the remote controller 900 can include one or more output mechanisms mounted on the controller body 902 for communicating information to the user, such as the warning information described herein. For instance, the controller 900 can include one or more speakers 910 configured to output audible alerts to the user. Different warning sounds can be played to alert the user of different types of safety issues. In some embodiments, the speakers 910 can play verbal alerts or instructions for the user. Alternatively or in combination, the controller 900 can include one or more indicator lights 912 (e.g., LEDs), which may be illuminated according to various colors and patterns (e.g., blinking, flashing, constant) to indicate various types of warning information. In one example, a green light may be used to indicate a normal state, a yellow light may be used to indicate a potential safety risk, while a red light may be used to indicate an urgent safety risk requiring immediate user action. Alternatively or in combination, at least some of the indicator lights 912 can also be used to display information relating to the remote controller 900 (e.g., the remaining battery level for the controller 900).

Figure 10:
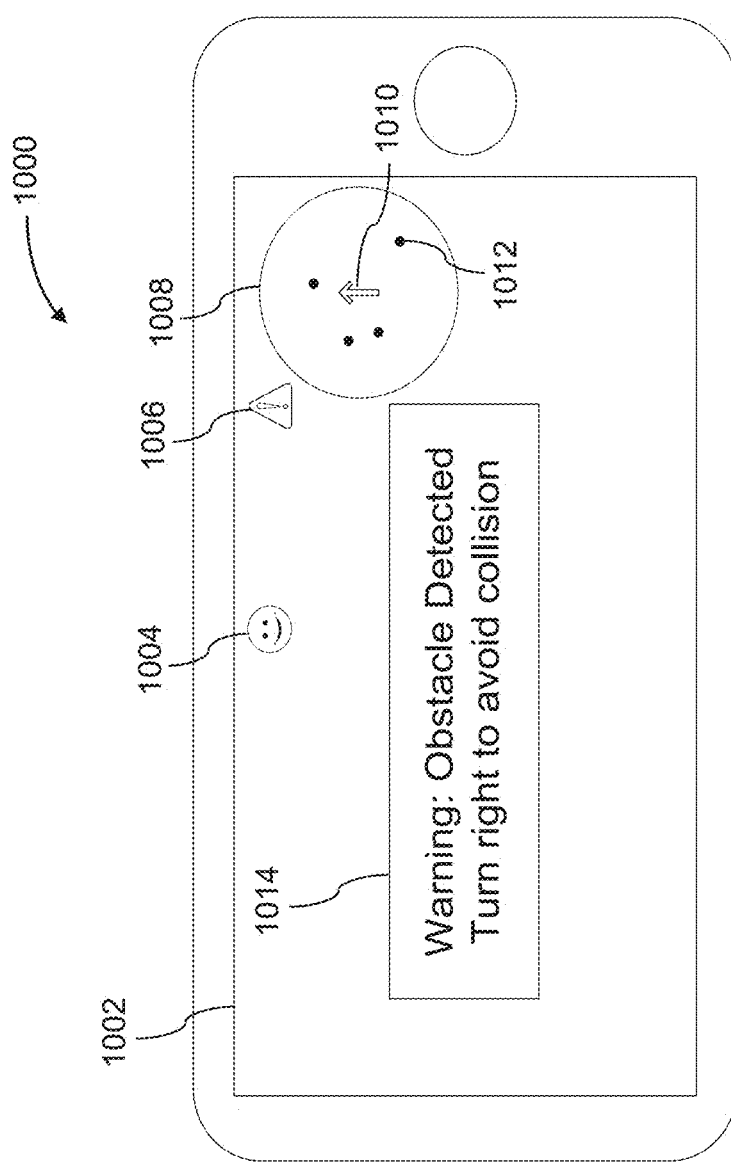
FIG. 10 illustrates a mobile device configured to display information relating to UAV operation, in accordance with embodiments.

FIG. 10 illustrates a mobile device 1000 configured to display information relating to UAV operation, in accordance with embodiments. The mobile device 1000, depicted herein as a smartphone, can include a display 1002 (e.g., a screen, touchscreen) configured to display UAV-related information. For instance, the mobile device 1000 can run a mobile application ("app") that provides a graphical user interface for operating the UAV. The display 1002 can be used to present various types of information regarding the operation of the UAV, such as the current state (e.g., position, orientation, velocity, acceleration, distance from the user, current flight mode, battery life remaining, etc.), data collected by one or more sensors (e.g., images or a video feed from a camera), information relating to the environment (e.g., environmental conditions, map data), and the like. In some embodiments, the display 1002 can be used to present warning information to the user. For example, the display 1002 can display one or more state icons 1004 indicating whether the UAV state is currently normal, or whether a fault or malfunction has been detected. The display 1002 can also display one or more warning icons 1006 to alert the user to a detected safety risk, such as a nearby obstacle.

Optionally, the display 1002 can include a graphical representation of the spatial disposition of one or more obstacles relative to the UAV, such as an obstacle map 1008. The obstacle map 1008 can include an indicator 1010 representing the position and/or orientation of the UAV, as well as one or more indicators 1012 representing the size, position, and/or orientation of one or more obstacles relative to the UAV. For example, the obstacle map 1008 can depict all detected obstacles within a 10 m radius of the UAV. Furthermore, the display 1002 can be used to present textual alerts 1014 that inform the user about the type of safety risk detected and/or provide instructions guiding the user to take action to mitigate the risk. Additionally, the mobile device 1000 can include one or more speakers (not shown) adapted to output audible alerts (e.g., similar to the embodiments described above with respect to the remote controller 900).

The systems, devices, and methods described herein can be applied to a wide variety of movable objects. As previously mentioned, any description herein of an aerial vehicle may apply to and be used for any movable object. A movable object of the present invention can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle; a movable structure or frame such as a stick, fishing pole; or a train), under the ground (e.g., a subway), in space (e.g., a spaceplane, a satellite, or a probe), or any combination of these environments. The movable object can be a vehicle, such as a vehicle described elsewhere herein. In some embodiments, the movable object can be mounted on a living subject, such as a human or an animal. Suitable animals can include avines, canines, felines, equines, bovines, ovines, porcines, delphines, rodents, or insects.

The movable object may be capable of moving freely within the environment with respect to six degrees of freedom (e.g., three degrees of freedom in translation and three degrees of freedom in rotation). Alternatively, the movement of the movable object can be constrained with respect to one or more degrees of freedom, such as by a predetermined path, track, or orientation. The movement can be actuated by any suitable actuation mechanism, such as an engine or a motor. The actuation mechanism of the movable object can be powered by any suitable energy source, such as electrical energy, magnetic energy, solar energy, wind energy, gravitational energy, chemical energy, nuclear energy, or any suitable combination thereof. The movable object may be self-propelled via a propulsion system, as described elsewhere herein. The propulsion system may optionally run on an energy source, such as electrical energy, magnetic energy, solar energy, wind energy, gravitational energy, chemical energy, nuclear energy, or any suitable combination thereof. Alternatively, the movable object may be carried by a living being.

In some instances, the movable object can be a vehicle. Suitable vehicles may include water vehicles, aerial vehicles, space vehicles, or ground vehicles. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). A vehicle can be self-propelled, such as self-propelled through the air, on or in water, in space, or on or under the ground. A self-propelled vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

The movable object can be controlled remotely by a user or controlled locally by an occupant within or on the movable object. In some embodiments, the movable object is an unmanned movable object, such as a UAV. An unmanned movable object, such as a UAV, may not have an occupant onboard the movable object. The movable object can be controlled by a human or an autonomous control system (e.g., a computer control system), or any suitable combination thereof. The movable object can be an autonomous or semi-autonomous robot, such as a robot configured with an artificial intelligence.

The movable object can have any suitable size and/or dimensions. In some embodiments, the movable object may be of a size and/or dimensions to have a human occupant within or on the vehicle. Alternatively, the movable object may be of size and/or dimensions smaller than that capable of having a human occupant within or on the vehicle. The movable object may be of a size and/or dimensions suitable for being lifted or carried by a human. Alternatively, the movable object may be larger than a size and/or dimensions suitable for being lifted or carried by a human. In some instances, the movable object may have a maximum dimension (e.g., length, width, height, diameter, diagonal) of less than or equal to about: 2 cm, 5 cm, 10 cm, 50 cm, 1 m, 2 m, 5 m, or 10 m. The maximum dimension may be greater than or equal to about: 2 cm, 5 cm, 10 cm, 50 cm, 1 m, 2 m, 5 m, or 10 m. For example, the distance between shafts of opposite rotors of the movable object may be less than or equal to about: 2 cm, 5 cm, 10 cm, 50 cm, 1 m, 2 m, 5 m, or 10 m. Alternatively, the distance between shafts of opposite rotors may be greater than or equal to about: 2 cm, 5 cm, 10 cm, 50 cm, 1 m, 2 m, 5 m, or 10 m.

In some embodiments, the movable object may have a volume of less than 100 cm×100 cm×100 cm, less than 50 cm×50 cm×30 cm, or less than 5 cm×5 cm×3 cm. The total volume of the movable object may be less than or equal to about: 1 $cm^3$, 2 $cm^3$, 5 $cm^3$, 10 $cm^3$, 20 $cm^3$, 30 $cm^3$, 40 $cm^3$, 50 $cm^3$, 60 $cm^3$, 70 $cm^3$, 80 $cm^3$, 90 $cm^3$, 100 $cm^3$, 150 $cm^3$, 200 $cm^3$, 300 $cm^3$, 500 $cm^3$, 750 $cm^3$, 1000 $cm^3$, 5000 $cm^3$, 10,000 $cm^3$, 100,000 $cm^3$, 1 $m^3$, or 10 $m^3$. Conversely, the total volume of the movable object may be greater than or equal to about: 1 $cm^3$, 2 $cm^3$, 5 $cm^3$, 10 $cm^3$, 20 $cm^3$, 30 $cm^3$, 40 $cm^3$, 50 $cm^3$, 60 $cm^3$, 70 $cm^3$, 80 $cm^3$, 90 $cm^3$, 100 $cm^3$, 150 $cm^3$, 200 $cm^3$, 300 $cm^3$, 500 $cm^3$, 750 $cm^3$, 1000 $cm^3$, 5000 $cm^3$, 10,000 $cm^3$, 100,000 $cm^3$, 1 $m^3$, or 10 $m^3$.

In some embodiments, the movable object may have a footprint (which may refer to the lateral cross-sectional area encompassed by the movable object) less than or equal to about: 32,000 $cm^2$, 20,000 $cm^2$, 10,000 $cm^2$, 1,000 $cm^2$, 500 $cm^2$, 100 $cm^2$, 50 $cm^2$, 10 $cm^2$, or 5 $cm^2$. Conversely, the footprint may be greater than or equal to about: 32,000 $cm^2$, 20,000 $cm^2$, 10,000 $cm^2$, 1,000 $cm^2$, 500 $cm^2$, 100 $cm^2$, 50 $cm^2$, 10 $cm^2$, or 5 $cm^2$.

In some instances, the movable object may weigh no more than 1000 kg. The weight of the movable object may be less than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg. Conversely, the weight may be greater than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg.

In some embodiments, a movable object may be small relative to a load carried by the movable object. The load may include a payload and/or a carrier, as described in further detail below. In some examples, a ratio of a movable object weight to a load weight may be greater than, less than, or equal to about 1:1. In some instances, a ratio of a movable object weight to a load weight may be greater than, less than, or equal to about 1:1. Optionally, a ratio of a carrier weight to a load weight may be greater than, less than, or equal to about 1:1. When desired, the ratio of an movable object weight to a load weight may be less than or equal to: 1:2, 1:3, 1:4, 1:5, 1:10, or even less. Conversely, the ratio of a movable object weight to a load weight can also be greater than or equal to: 2:1, 3:1, 4:1, 5:1, 10:1, or even greater.

In some embodiments, the movable object may have low energy consumption. For example, the movable object may use less than about: 5 W/h, 4 W/h, 3 W/h, 2 W/h, 1 W/h, or less. In some instances, a carrier of the movable object may have low energy consumption. For example, the carrier may use less than about: 5 W/h, 4 W/h, 3 W/h, 2 W/h, 1 W/h, or less. Optionally, a payload of the movable object may have low energy consumption, such as less than about: 5 W/h, 4 W/h, 3 W/h, 2 W/h, 1 W/h, or less.

Figure 11:
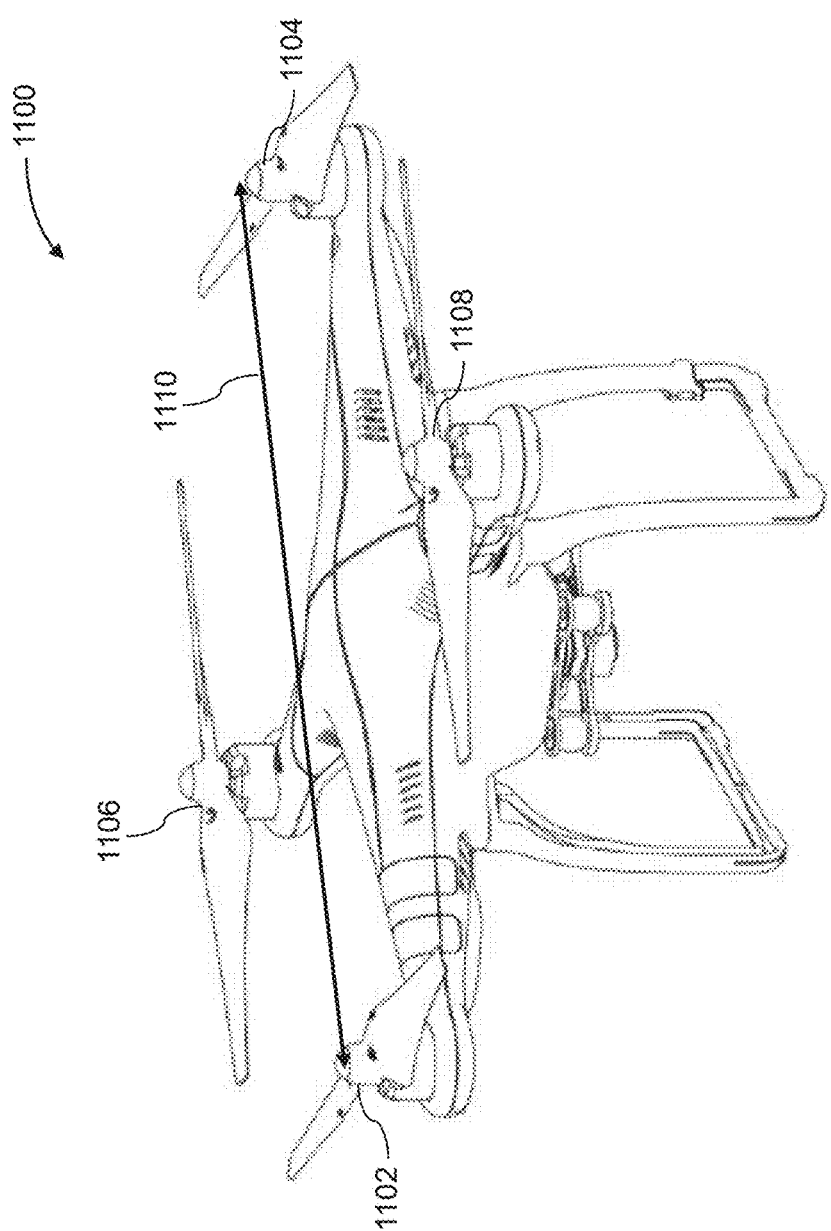
FIG. 11 illustrates an unmanned aerial vehicle, in accordance with embodiments.

FIG. 11 illustrates a UAV 1100, in accordance with embodiments of the present invention. The UAV may be an example of a movable object as described herein. The UAV 1100 can include a propulsion system having four rotors 1102, 1104, 1106, and 1108. Any number of rotors may be provided (e.g., one, two, three, four, five, six, or more). The rotors can be embodiments of the self-tightening rotors described elsewhere herein. The rotors, rotor assemblies, or other propulsion systems of the unmanned aerial vehicle may enable the unmanned aerial vehicle to hover/maintain position, change orientation, and/or change location. The distance between shafts of opposite rotors can be any suitable length 1110. For example, the length 1110 can be less than or equal to 2 m, or less than equal to 5 m. In some embodiments, the length 1110 can be within a range from 40 cm to 1 m, from 10 cm to 2 m, or from 5 cm to 5 m. Any description herein of a UAV may apply to a movable object, such as a movable object of a different type, and vice versa.

In some embodiments, the movable object can be configured to carry a load. The load can include one or more of passengers, cargo, equipment, instruments, and the like. The load can be provided within a housing. The housing may be separate from a housing of the movable object, or be part of a housing for an movable object. Alternatively, the load can be provided with a housing while the movable object does not have a housing. Alternatively, portions of the load or the entire load can be provided without a housing. The load can be rigidly fixed relative to the movable object. Optionally, the load can be movable relative to the movable object (e.g., translatable or rotatable relative to the movable object).

In some embodiments, the load includes a payload. The payload can be configured not to perform any operation or function. Alternatively, the payload can be a payload configured to perform an operation or function, also known as a functional payload. For example, the payload can include one or more sensors for surveying one or more targets. Any suitable sensor can be incorporated into the payload, such as an image capture device (e.g., a camera), an audio capture device (e.g., a parabolic microphone), an infrared imaging device, or an ultraviolet imaging device. The sensor can provide static sensing data (e.g., a photograph) or dynamic sensing data (e.g., a video). In some embodiments, the sensor provides sensing data for the target of the payload. Alternatively or in combination, the payload can include one or more emitters for providing signals to one or more targets. Any suitable emitter can be used, such as an illumination source or a sound source. In some embodiments, the payload includes one or more transceivers, such as for communication with a module remote from the movable object. Optionally, the payload can be configured to interact with the environment or a target. For example, the payload can include a tool, instrument, or mechanism capable of manipulating objects, such as a robotic arm.

Optionally, the load may include a carrier. The carrier can be provided for the payload and the payload can be coupled to the movable object via the carrier, either directly (e.g., directly contacting the movable object) or indirectly (e.g., not contacting the movable object). Conversely, the payload can be mounted on the movable object without requiring a carrier. The payload can be integrally formed with the carrier. Alternatively, the payload can be releasably coupled to the carrier. In some embodiments, the payload can include one or more payload elements, and one or more of the payload elements can be movable relative to the movable object and/or the carrier, as described above.

The carrier can be integrally formed with the movable object. Alternatively, the carrier can be releasably coupled to the movable object. The carrier can be coupled to the movable object directly or indirectly. The carrier can provide support to the payload (e.g., carry at least part of the weight of the payload). The carrier can include a suitable mounting structure (e.g., a gimbal platform) capable of stabilizing and/or directing the movement of the payload. In some embodiments, the carrier can be adapted to control the state of the payload (e.g., position and/or orientation) relative to the movable object. For example, the carrier can be configured to move relative to the movable object (e.g., with respect to one, two, or three degrees of translation and/or one, two, or three degrees of rotation) such that the payload maintains its position and/or orientation relative to a suitable reference frame regardless of the movement of the movable object. The reference frame can be a fixed reference frame (e.g., the surrounding environment). Alternatively, the reference frame can be a moving reference frame (e.g., the movable object, a payload target).

In some embodiments, the carrier can be configured to permit movement of the payload relative to the carrier and/or movable object. The movement can be a translation with respect to up to three degrees of freedom (e.g., along one, two, or three axes) or a rotation with respect to up to three degrees of freedom (e.g., about one, two, or three axes), or any suitable combination thereof.

In some instances, the carrier can include a carrier frame assembly and a carrier actuation assembly. The carrier frame assembly can provide structural support to the payload. The carrier frame assembly can include individual carrier frame components, some of which can be movable relative to one another. The carrier actuation assembly can include one or more actuators (e.g., motors) that actuate movement of the individual carrier frame components. The actuators can permit the movement of multiple carrier frame components simultaneously, or may be configured to permit the movement of a single carrier frame component at a time. The movement of the carrier frame components can produce a corresponding movement of the payload. For example, the carrier actuation assembly can actuate a rotation of one or more carrier frame components about one or more axes of rotation (e.g., roll axis, pitch axis, or yaw axis). The rotation of the one or more carrier frame components can cause a payload to rotate about one or more axes of rotation relative to the movable object. Alternatively or in combination, the carrier actuation assembly can actuate a translation of one or more carrier frame components along one or more axes of translation, and thereby produce a translation of the payload along one or more corresponding axes relative to the movable object.

In some embodiments, the movement of the movable object, carrier, and payload relative to a fixed reference frame (e.g., the surrounding environment) and/or to each other, can be controlled by a terminal. The terminal can be a remote control device at a location distant from the movable object, carrier, and/or payload. The terminal can be disposed on or affixed to a support platform. Alternatively, the terminal can be a handheld or wearable device. For example, the terminal can include a smartphone, tablet, laptop, computer, glasses, gloves, helmet, microphone, or suitable combinations thereof. The terminal can include a user interface, such as a keyboard, mouse, joystick, touchscreen, or display. Any suitable user input can be used to interact with the terminal, such as manually entered commands, voice control, gesture control, or position control (e.g., via a movement, location or tilt of the terminal).

The terminal can be used to control any suitable state of the movable object, carrier, and/or payload. For example, the terminal can be used to control the position and/or orientation of the movable object, carrier, and/or payload relative to a fixed reference from and/or to each other. In some embodiments, the terminal can be used to control individual elements of the movable object, carrier, and/or payload, such as the actuation assembly of the carrier, a sensor of the payload, or an emitter of the payload. The terminal can include a wireless communication device adapted to communicate with one or more of the movable object, carrier, or payload.

The terminal can include a suitable display unit for viewing information of the movable object, carrier, and/or payload. For example, the terminal can be configured to display information of the movable object, carrier, and/or payload with respect to position, translational velocity, translational acceleration, orientation, angular velocity, angular acceleration, or any suitable combinations thereof. In some embodiments, the terminal can display information provided by the payload, such as data provided by a functional payload (e.g., images recorded by a camera or other image capturing device).

Optionally, the same terminal may both control the movable object, carrier, and/or payload, or a state of the movable object, carrier and/or payload, as well as receive and/or display information from the movable object, carrier and/or payload. For example, a terminal may control the positioning of the payload relative to an environment, while displaying image data captured by the payload, or information about the position of the payload. Alternatively, different terminals may be used for different functions. For example, a first terminal may control movement or a state of the movable object, carrier, and/or payload while a second terminal may receive and/or display information from the movable object, carrier, and/or payload. For example, a first terminal may be used to control the positioning of the payload relative to an environment while a second terminal displays image data captured by the payload. Various communication modes may be utilized between a movable object and an integrated terminal that both controls the movable object and receives data, or between the movable object and multiple terminals that both control the movable object and receives data. For example, at least two different communication modes may be formed between the movable object and the terminal that both controls the movable object and receives data from the movable object.

Figure 12:
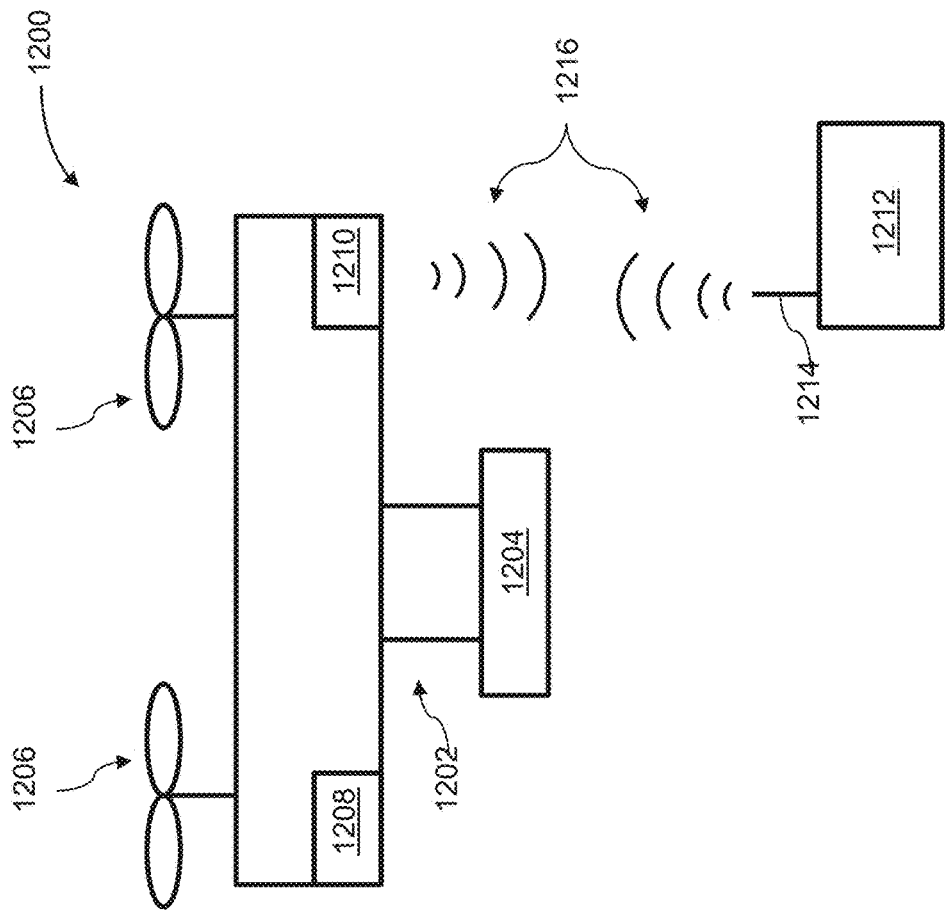
FIG. 12 illustrates a movable object including a carrier and a payload, in accordance with embodiments.

FIG. 12 illustrates a movable object 1200 including a carrier 1202 and a payload 1204, in accordance with embodiments. Although the movable object 1200 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., a UAV). In some instances, the payload 1204 may be provided on the movable object 1200 without requiring the carrier 1202. The movable object 1200 may include propulsion mechanisms 1206, a sensing system 1208, and a communication system 1210.

The propulsion mechanisms 1206 can include one or more of rotors, propellers, blades, engines, motors, wheels, axles, magnets, or nozzles, as previously described. For example, the propulsion mechanisms 1206 may be self-tightening rotors, rotor assemblies, or other rotary propulsion units, as disclosed elsewhere herein. The movable object may have one or more, two or more, three or more, or four or more propulsion mechanisms. The propulsion mechanisms may all be of the same type. Alternatively, one or more propulsion mechanisms can be different types of propulsion mechanisms. The propulsion mechanisms 1206 can be mounted on the movable object 1200 using any suitable means, such as a support element (e.g., a drive shaft) as described elsewhere herein. The propulsion mechanisms 1206 can be mounted on any suitable portion of the movable object 1200, such on the top, bottom, front, back, sides, or suitable combinations thereof.

In some embodiments, the propulsion mechanisms 1206 can enable the movable object 1200 to take off vertically from a surface or land vertically on a surface without requiring any horizontal movement of the movable object 1200 (e.g., without traveling down a runway). Optionally, the propulsion mechanisms 1206 can be operable to permit the movable object 1200 to hover in the air at a specified position and/or orientation. One or more of the propulsion mechanism 1200 may be controlled independently of the other propulsion mechanisms. Alternatively, the propulsion mechanisms 1200 can be configured to be controlled simultaneously. For example, the movable object 1200 can have multiple horizontally oriented rotors that can provide lift and/or thrust to the movable object. The multiple horizontally oriented rotors can be actuated to provide vertical takeoff, vertical landing, and hovering capabilities to the movable object 1200. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 1200 (e.g., with respect to up to three degrees of translation and up to three degrees of rotation).

The sensing system 1208 can include one or more sensors that may sense the spatial disposition, velocity, and/or acceleration of the movable object 1200 (e.g., with respect to up to three degrees of translation and up to three degrees of rotation). The one or more sensors can include any of the sensors previously described herein, including GPS sensors, motion sensors, inertial sensors, proximity sensors, or image sensors. The sensing data provided by the sensing system 1208 can be used to control the spatial disposition, velocity, and/or orientation of the movable object 1200 (e.g., using a suitable processing unit and/or control module, as described below). Alternatively, the sensing system 1208 can be used to provide data regarding the environment surrounding the movable object, such as weather conditions, proximity to potential obstacles, location of geographical features, location of manmade structures, and the like.

The communication system 1210 enables communication with terminal 1212 having a communication system 1214 via wireless signals 1216. The communication systems 1210, 1214 may include any number of transmitters, receivers, and/or transceivers suitable for wireless communication. The communication may be one-way communication, such that data can be transmitted in only one direction. For example, one-way communication may involve only the movable object 1200 transmitting data to the terminal 1212, or vice-versa. The data may be transmitted from one or more transmitters of the communication system 1210 to one or more receivers of the communication system 1212, or vice-versa. Alternatively, the communication may be two-way communication, such that data can be transmitted in both directions between the movable object 1200 and the terminal 1212. The two-way communication can involve transmitting data from one or more transmitters of the communication system 1210 to one or more receivers of the communication system 1214, and vice-versa.

In some embodiments, the terminal 1212 can provide control data to one or more of the movable object 1200, carrier 1202, and payload 1204 and receive information from one or more of the movable object 1200, carrier 1202, and payload 1204 (e.g., position and/or motion information of the movable object, carrier or payload; data sensed by the payload such as image data captured by a payload camera). In some instances, control data from the terminal may include instructions for relative positions, movements, actuations, or controls of the movable object, carrier and/or payload. For example, the control data may result in a modification of the location and/or orientation of the movable object (e.g., via control of the propulsion mechanisms 1206), or a movement of the payload with respect to the movable object (e.g., via control of the carrier 1202). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). In some instances, the communications from the movable object, carrier and/or payload may include information from one or more sensors (e.g., of the sensing system 1208 or of the payload 1204). The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier and/or payload. Such information from a payload may include data captured by the payload or a sensed state of the payload. The control data provided transmitted by the terminal 1212 can be configured to control a state of one or more of the movable object 1200, carrier 1202, or payload 1204. Alternatively or in combination, the carrier 1202 and payload 1204 can also each include a communication module configured to communicate with terminal 1212, such that the terminal can communicate with and control each of the movable object 1200, carrier 1202, and payload 1204 independently.

In some embodiments, the movable object 1200 can be configured to communicate with another remote device in addition to the terminal 1212, or instead of the terminal 1212. The terminal 1212 may also be configured to communicate with another remote device as well as the movable object 1200. For example, the movable object 1200 and/or terminal 1212 may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object 1200, receive data from the movable object 1200, transmit data to the terminal 1212, and/or receive data from the terminal 1212. Optionally, the remote device can be connected to the Internet or other telecommunications network, such that data received from the movable object 1200 and/or terminal 1212 can be uploaded to a website or server.

Figure 13:
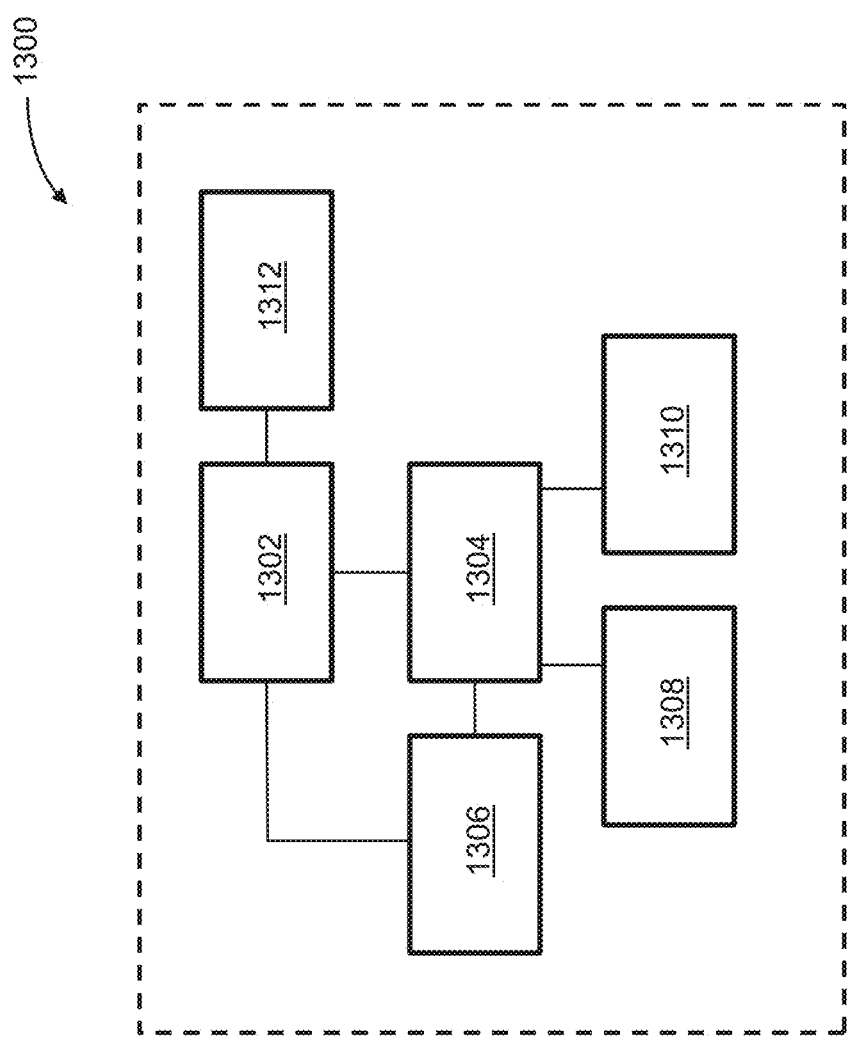
FIG. 13 illustrates a system for controlling a movable object, in accordance with embodiments.

FIG. 13 is a schematic illustration by way of block diagram of a system 1300 for controlling a movable object, in accordance with embodiments. The system 1300 can be used in combination with any suitable embodiment of the systems, devices, and methods disclosed herein. The system 1300 can include a sensing module 1302, processing unit 1304, non-transitory computer readable medium 1306, control module 1308, and communication module 1310.

The sensing module 1302 can utilize different types of sensors that collect information relating to the movable objects in different ways. Different types of sensors may sense different types of signals or signals from different sources. For example, the sensors can include inertial sensors, GPS sensors, proximity sensors (e.g., lidar), or vision/image sensors (e.g., a camera). The sensing module 1302 can be operatively coupled to a processing unit 1304 having a plurality of processors. In some embodiments, the sensing module can be operatively coupled to a transmission module 1312 (e.g., a Wi-Fi image transmission module) configured to directly transmit sensing data to a suitable external device or system. For example, the transmission module 1312 can be used to transmit images captured by a camera of the sensing module 1302 to a remote terminal.

The processing unit 1304 can have one or more processors, such as a programmable processor (e.g., a central processing unit (CPU)). The processing unit 1304 can be operatively coupled to a non-transitory computer readable medium 1306. The non-transitory computer readable medium 1306 can store logic, code, and/or program instructions executable by the processing unit 1304 for performing one or more steps. The non-transitory computer readable medium can include one or more memory units (e.g., removable media or external storage such as an SD card or random access memory (RAM)). In some embodiments, data from the sensing module 1302 can be directly conveyed to and stored within the memory units of the non-transitory computer readable medium 1306. The memory units of the non-transitory computer readable medium 1306 can store logic, code and/or program instructions executable by the processing unit 1304 to perform any suitable embodiment of the methods described herein. For example, the processing unit 1304 can be configured to execute instructions causing one or more processors of the processing unit 1304 to analyze sensing data produced by the sensing module. The memory units can store sensing data from the sensing module to be processed by the processing unit 1304. In some embodiments, the memory units of the non-transitory computer readable medium 1306 can be used to store the processing results produced by the processing unit 1304.

In some embodiments, the processing unit 1304 can be operatively coupled to a control module 1308 configured to control a state of the movable object. For example, the control module 1308 can be configured to control the propulsion mechanisms of the movable object to adjust the spatial disposition, velocity, and/or acceleration of the movable object with respect to six degrees of freedom. Alternatively or in combination, the control module 1308 can control one or more of a state of a carrier, payload, or sensing module.

The processing unit 1304 can be operatively coupled to a communication module 1310 configured to transmit and/or receive data from one or more external devices (e.g., a terminal, display device, or other remote controller). Any suitable means of communication can be used, such as wired communication or wireless communication. For example, the communication module 1310 can utilize one or more of local area networks (LAN), wide area networks (WAN), infrared, radio, WiFi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication module 1310 can transmit and/or receive one or more of sensing data from the sensing module 1302, processing results produced by the processing unit 1304, predetermined control data, user commands from a terminal or remote controller, and the like.

The components of the system 1300 can be arranged in any suitable configuration. For example, one or more of the components of the system 1300 can be located on the movable object, carrier, payload, terminal, sensing system, or an additional external device in communication with one or more of the above. Additionally, although FIG. 13 depicts a single processing unit 1304 and a single non-transitory computer readable medium 1306, one of skill in the art would appreciate that this is not intended to be limiting, and that the system 1300 can include a plurality of processing units and/or non-transitory computer readable media. In some embodiments, one or more of the plurality of processing units and/or non-transitory computer readable media can be situated at different locations, such as on the movable object, carrier, payload, terminal, sensing module, additional external device in communication with one or more of the above, or suitable combinations thereof, such that any suitable aspect of the processing and/or memory functions performed by the system 1300 can occur at one or more of the aforementioned locations.

As used herein A and/or B encompasses one or more of A or B, and combinations thereof such as A and B.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A system for controlling an unmanned aerial vehicle (UAV), the system comprising:
    one or more processors configured to:
        identify an environment type for the UAV from a plurality of different environment types;
        select a flight mode from a plurality of different flight modes based on the identified environment type, wherein each of the plurality of different flight modes contains a different set of operating rules for the UAV;
        detect a safety risk for the UAV based on sensor data collected by one or more sensors carried onboard the UAV; and
        effect operation of the UAV in response to the detected safety risk in accordance with the set of operating rules of the selected flight mode.

2. The system of claim 1, wherein the one or more sensors comprise one or more of: a GPS sensor, an inertial sensor, a vision sensor, a lidar sensor, an ultrasonic sensor, a barometer, or an altimeter.

3. The system of claim 1, wherein the sensor data is indicative of a physical state of the UAV and the physical state of the UAV comprises a spatial disposition and/or state of motion of the UAV detected by the one or more sensors.

4. The system of claim 1, wherein the plurality of different flight modes comprise one or more modes selected from the group comprising: an indoor flight mode, an outdoor flight mode, a high altitude flight mode, a low altitude flight mode, a long range flight mode, a short range flight mode, a fully autonomous flight mode, a semi-autonomous flight mode, a manual flight mode, and an autonomous return mode.

5. The system of claim 4, wherein at least one of the plurality of different flight modes comprise a set of operating rules for implementing an autonomous obstacle avoidance strategy.

6. The system of claim 4, wherein the sensor data is further indicative of a distance between the UAV and a remote controller, and
    wherein the one or more processors are configured to: (a) select the short range flight mode when the distance between the UAV and the remote controller is less than a predetermined threshold distance, and (b) select the long range flight mode when the distance between the UAV and the remote controller is greater than the predetermined threshold distance.

7. The system of claim 6, wherein the short range flight mode provides a greater degree of control over the UAV to an operator of the UAV, as compared to the long range flight mode.

8. The system of claim 1, wherein the different sets of operating rules for the UAV are configured to control one or more of the following: (i) a physical state of the UAV, (ii) a behavior of the UAV within the environment type, or (iii) one or more functionalities of the UAV.

9. The system of claim 8, wherein the one or more functionalities of the UAV are associated with obstacle collision avoidance, fault detection, safety mechanisms, flight navigation, environmental mapping, aerial photography, and/or sensor data collection.

10. The system of claim 1, wherein the sensor data is indicative of an operational state of one or more components onboard the UAV and the operational state of the one or more components is indicative of: (i) whether the one or more components are malfunctioning, (ii) a power level of the one or more components, and/or (iii) a strength of the signals received by the one or more components.

11. The system of claim 10, wherein the one or more processors are configured to select an autonomous return mode from the plurality of different flight modes when (i) the one or more components are malfunctioning, and/or (ii) when the power level of the one or more components falls below a predetermined power threshold.

12. The system of claim 10, wherein the one or more processors are configured to select an autonomous return mode from the plurality of different flight modes when the strength of the received signals falls below a predetermined signal threshold.

13. The system of claim 10, wherein the one or more components comprise a GPS sensor onboard the UAV, and wherein the strength of the GPS signals depends on the environment type in which the UAV is operating.

14. The system of claim 1, wherein the one or more processors are configured to:
select two or more flight modes from the plurality of plurality of different flight modes;
determine whether two or more selected flight modes will conflict with one another and affect the operation of the UAV; and
prioritize between the two or more selected flight modes when the two or more selected modes are determined to conflict with one another, so as to mitigate the conflict.

15. The system of claim 1, wherein the one or more processors are configured to select the one or more flight modes (i) based on the sensor data and (ii) in response to a user input command received at a remote controller.

16. The system of claim 15, wherein the one or more processors are configured to override the user input command if the user input command causes a first flight mode to be selected that would result in collision of the UAV with one or more obstacles.

17. The system of claim 16, wherein the one or more processors are configured to select a second flight mode instead of the first flight mode to prevent collision of the UAV with the one or more obstacles, and wherein the second flight mode is selected based on the sensor data and comprises a set of operating rules for implementing an autonomous obstacle avoidance strategy.

18. The system of claim 1, wherein the detected safety risk comprises a system malfunction.

19. The system of claim 1, wherein detecting the safety risk comprises:
predicting a UAV state based on the sensor data; and
comparing the predicted UAV state with an actual UAV state.

20. A method of controlling an unmanned aerial vehicle (UAV), comprising:
identifying an environment type for the UAV from a plurality of different environment types;
selecting a flight mode from a plurality of different flight modes based on the identified environment types, wherein each of the plurality of different flight modes contains a different set of operating rules for the UAV;
detecting a safety risk for the UAV based on sensor data collected by one or more sensors carried onboard the UAV; and
effecting operation of the UAV in response to the detected safety risk in accordance with the set of operating rules of the selected flight mode.

21. The method of claim 20, wherein the selecting of the one or more flight modes is (i) based on the sensor data and (ii) in response to a user input command received at a remote controller.

22. The method of claim 21, further comprising: overriding the user input command if the user input command causes a first flight mode to be selected that would result in collision of the UAV with one or more obstacles.

* * * * *